United States Patent
Ramachandra et al.

(10) Patent No.: US 12,484,091 B2
(45) Date of Patent: Nov. 25, 2025

(54) METHODS FOR MOBILITY RELATED HANDOVER IN NR

(71) Applicant: Telefonaktiebolaget LM Ericsson (publ), Stockholm (SE)

(72) Inventors: Pradeepa Ramachandra, Linköping (SE); Icaro Leonardo Da Silva, Solna (SE); Helka-Liina Määttanen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 385 days.

(21) Appl. No.: 18/030,344

(22) PCT Filed: Nov. 2, 2021

(86) PCT No.: PCT/IB2021/060139
§ 371 (c)(1),
(2) Date: Apr. 5, 2023

(87) PCT Pub. No.: WO2022/091072
PCT Pub. Date: May 5, 2022

(65) Prior Publication Data
US 2023/0379769 A1 Nov. 23, 2023

Related U.S. Application Data

(60) Provisional application No. 63/108,599, filed on Nov. 2, 2020.

(51) Int. Cl.
*H04W 4/00* (2018.01)
*H04W 36/00* (2009.01)
(Continued)

(52) U.S. Cl.
CPC ... *H04W 74/0833* (2013.01); *H04W 36/0064* (2023.05); *H04W 36/085* (2023.05); *H04W 74/0838* (2024.01)

(58) Field of Classification Search
CPC .......... H04W 36/0064; H04W 36/085; H04W 74/0833; H04W 74/0838
See application file for complete search history.

(56) References Cited

U.S. PATENT DOCUMENTS

| 2014/0092866 A1 | 4/2014 | Teyeb et al. |
| 2018/0279182 A1 | 9/2018 | Sang et al. |

(Continued)

FOREIGN PATENT DOCUMENTS

| EP | 3562209 A1 * | 10/2019 | ........ H04W 36/0058 |
| WO | 2020198645 A1 | 10/2020 | |

OTHER PUBLICATIONS

International Search Report and Written Opinion of the International Searching Authority, PCT/IB2021/060139, mailed Feb. 11, 2022, 14 pages.

(Continued)

*Primary Examiner* — Thai Dinh Hoang
(74) *Attorney, Agent, or Firm* — Sage Patent Group

(57) ABSTRACT

A method of operating a user equipment, UE, according to some embodiments includes receiving a handover, HO, command, to perform a handover to a target cell, wherein the HO command includes a mobility configuration for lower layer mobility associated to multiple physical cell identities, PCIs, configured for the target cell, and applying the HO command including the mobility configuration. A method of operating a first network node includes receiving a HO request from a second network node to handover a UE to the first network node, the HO request including measurement information associated to multiple cells or multiple PCIs associated to the first network node, generating a HO command that includes a mobility configuration for lower layer mobility associated to multiple PCIs configured for the (Continued)

target cell, and transmitting the HO command to the second network node for delivery to the UE.

20 Claims, 11 Drawing Sheets

(51) Int. Cl.
  *H04W 36/08* (2009.01)
  *H04W 74/0833* (2024.01)
  *H04W 74/0838* (2024.01)

(56) References Cited

U.S. PATENT DOCUMENTS

| | | | |
|---|---|---|---|
| 2019/0297537 | A1 | 9/2019 | Tsai et al. |
| 2019/0380081 | A1* | 12/2019 | Chang ............... H04W 36/0069 |
| 2020/0296635 | A1 | 9/2020 | Rastegardoost et al. |
| 2024/0015626 | A1* | 1/2024 | Chang ............... H04W 36/0072 |
| 2024/0224150 | A1* | 7/2024 | Chang ............... H04W 36/0079 |
| 2024/0236793 | A1* | 7/2024 | Chandrashekar ..... H04W 36/06 |

OTHER PUBLICATIONS

Samsung, "New WID: Further enhancements on MIMO for NR," 3GPP TSG RAN Meeting #86, RP-193133, Sitges, Spain, Dec. 9-12, 2019, 5 pages.

3GPP TS 38.133 v16.5.0 (Sep. 2020); 3rd Generation Partnership Project; Technical Specification Group Radio Access Network; NR; Requirements for support of radio resource management (Release 16); 1608 pages.

ETSI TS 138 321 v16.2.1 (Nov. 2020); Technical Specification; 5G; NR; Medium Access Control (MAC) protocol specification (3GPP TRS 38.321 version 16.2.1 Release 16), 156 pages.

3GPP TS 38.213 v16.3.0 (Sep. 2020); 3rd Generation Partnership Project; Technical Specification Group Radio Access Network; NR; Physical layer procedures for control (Release 16); 179 pages.

Mediatek, "Correction on RLF Report Content Handover from NR to LTE Failure," 3GPP TSG-RAN2 113e, R2-2100427 (Change request for 38.331 CR 2024 ref—Current Version: 16.2.0), Online Jan. 25-Feb. 5, 2021, 4 pages.

3GPP TS 38.211 v16.2.0 (Jun. 2020); 3rd Generation Partnership Project; Technical Specification Group Radio Access Network; NR; Physical channels and modulation (Release 16); 131 pages.

3GPP TS 38.300 v16.3.0 (Sep. 2020); 3rd Generation Partnership Project; Technical Specification Group Radio Access Network; NR; NR and NG-RAN Overall Description; Stage 2 (Release 16); 148 pages.

3GPP TS 38.331 v16.3.0 (Dec. 2020); 3rd Generation Partnership Project; Technical Specification Group Radio Access Network; NR; Radio Resource Control (RRC) protocol specification (Release 16); 932 pages.

* cited by examiner

- LTE and NR
  - PSS/SSS = physical cell identifier (PCI)
- LTE and NR
  - PSS/SSS is a sync source
- NR
  - Multiple PSS/SSS with same PCI transmitted in DL beams
  - Beam sweeping defining cell coverage Wireless Device UE Operations Radio Access Network (RAN) Node Operations Radio Access Network (RAN) Node Operations Radio Access Network (RAN) Node Operations

METHODS FOR MOBILITY RELATED HANDOVER IN NR

CROSS REFERENCE TO RELATED APPLICATIONS

This application is a 35 U.S.C. § 371 national stage application of PCT International Application No. PCT/IB2021/060139 filed on Nov. 2, 2021, which in turn claims domestic priority to U.S. Provisional Patent Application No. 63/108,599, filed on Nov. 2, 2020, the disclosures and content of which are incorporated by reference herein in their entirety.

BACKGROUND

The present disclosure relates generally to communications, and more particularly to communication methods and related devices and nodes supporting wireless communications.

In connected state, a user equipment (UE) has a connection established to the network. The aim of connected-state mobility is to ensure that the connectivity is retained with no interruption or noticeable degradation as the device moves within the network. The UE is required to do searches for new cells both on the current carrier frequency (intra-frequency) and different carrier frequencies (inter-frequency) that are informed by the network. The UE does not make any decisions on its own regarding when it is time to trigger a handover (HO) procedure to a different cell. This is rather based on a variety of triggering conditions. In general, the UE reports the results of any configured measurements to the network so that the network can make a decision on whether or not it is time for handover to a new cell.

In the 5G New Radio (NR) specification, handover is a special case of a procedure called "reconfiguration with sync." In addition, a variety of handover mechanisms, such as Dual Active Protocol Stack (DAPS), conditional handover (CHO), and RACH-less HO (i.e., HO that does not involve the Random Access Channel (RACH)), have been introduced in specifications to enhance the mobility robustness performance for challenging scenarios that require low-latency and high reliability performance.

The NR/LTE protocol stack generally includes three layers, L1, L2 and L3. L1 includes the physical layer (PHY). L2 encompasses the medium access control (MAC), radio link control (RLC) and packet data convergence protocol (PDCP) layers, and L3 encompasses the radio resource control (RRC) and non-access stratum (NAS) layers. The functions of these layers are defined in the NR standard specification documents. Generally, lower layers in the protocol stack provide services to higher layers. Higher level operations are typically handled at higher layers. For example, handover is typically managed at the L3 level by RRC.

The basic L3 HO is quite similar to the LTE mobility functionality: it is based on event-driven measurement reporting over RRC, where the UE performs measurement on various reference signals (mapping to cells) and filters these measurements. When the filtered measurements fulfil certain criteria parametrized by the network (NW), the UE will trigger a measurement report. However, differently from LTE, in NR a cell may be defined by multiple beams, which may be realized by multiple Synchronization Signal/Physical Broadcast Channel (SS/PBCH) Blocks (SSB)s transmitted in different directional beams, while in LTE a single broadcasted signal is transmitted, as shown in FIG. 1, which illustrates differences between cell definition in NR and LTE.

That leads to a procedure where changing beams from different cells require RRC signaling and a set of UE protocols actions e.g. reset of buffers, etc.

FIG. 2 illustrates inter-cell inter-node beam changing (handover realized with RRC signaling in Rel-15).

According to [1], for inter-gNB handover (inter-cell and inter-node mobility), the signaling procedures consist of at least the following elemental components illustrated in FIG. 3, which illustrates inter-gNB handover procedures.

The following steps are illustrated in FIG. 3:
1. The source gNB initiates handover and issues a HANDOVER REQUEST over the Xn interface. This is possibly based on measurement reports, which may have been configured when the UE enters Connected state.
2. The target gNB performs admission control and provides the new RRC configuration as part of the HANDOVER REQUEST ACKNOWLEDGE.
3. The source gNB provides the RRC configuration to the UE by forwarding the RRCReconfiguration message received in the HANDOVER REQUEST ACKNOWLEDGE. The RRCReconfiguration message includes at least the cell ID and all information required to access the target cell so that the UE can access the target cell without reading system information. For some cases, the information required for contention-based and contention-free random access can be included in the RRCReconfiguration message. The access information to the target cell may include beam specific information, if any.
4. The UE moves the RRC connection to the target gNB and replies with the RRCReconfigurationComplete. User Data can also be sent in step 4 if the grant allows.

The handover mechanism triggered by RRC requires the UE at least to reset the MAC entity and re-establish RLC. RRC managed handovers with and without PDCP entity re-establishment are both supported. For Data Radio Bearers (DRBs) using RLC Acknowledged Mode (AM), PDCP can either be re-established together with a security key change or initiate a data recovery procedure without a key change. For DRBs using RLC Unacknowledged Mode (UM) and for Signalling Radio Bearers (SRBs), PDCP can either be re-established together with a security key change or remain as it is without a key change. Data forwarding, in-sequence delivery and duplication avoidance at handover can be guaranteed when the target gNB uses the same DRB configuration as the source gNB. Timer based handover failure procedure is supported in NR. RRC connection re-establishment procedure is used for recovering from handover failure.

Further Details Associated to Beams and Mobility

In legacy handover procedure (reconfiguration with sync for an Master Cell Group—MCG), the UE receives an RRCReconfiguration message including an IE ReconfigurationWithSync comprising information enabling the UE to access a target cell (which is a target PCell for an MCG), such as random access configuration, target's physical cell identity and frequency information (ARFCN) as described in [2].

As described in [2], the configuration of a target PCell (which is conventionally a single cell with a single PCI associated to it) in a handover command message (i.e. the RRCReconfiguration) comprises the following:

servCellIndex of IE ServCellIndex: The PCell of the Master Cell Group uses ID=0. The IE ServCellIndex concerns a short identity, used to identify a serving cell (i.e. the PCell, the PSCell or an SCell). Value 0 applies for the PCell, while the SCellIndex that has previously been assigned applies for SCells.

rlf-TimersAndConstants of IE SetupRelease {RLF-TimersAndConstants}: Timers and constants for detecting and triggering cell-level radio link failure.

rlmInSyncOutOfSyncThreshold: BLER threshold pair index for IS/OOS indication generation, see [6], table 8.1.1-1. n1 corresponds to the value 1. When the field is absent, the UE applies the value 0. Whenever this is reconfigured, UE resets N310 and N311, and stops T310, if running Network does not include this field.

spCellConfigDedicated of IE ServingCellConfig: used to configure (add or modify) the UE with a serving cell, e.g. PCel of an MCG. The parameters herein are mostly UE specific but partly also cell specific (e.g. in additionally configured bandwidth parts). Reconfiguration between a PUCCH and PUCCHless SCell is only supported using an SCell release and add. This is where in legacy the TCI states are configured, and the QCL associated with SSBs/CSI-RS.

ReconfigurationWithSync:
spCellConfigCommon (of IE ServingCellConfigCommon): used to configure cell specific parameters of a UE's serving cell. The IE contains parameters which a UE would typically acquire from SSB, MIB or SIBs when accessing the cell from IDLE. With this IE, the network provides this information in dedicated signalling when configuring a PCell upon reconfiguration with sync.

newUE-Identity of IE RNTI-Value: C-RNTI for this cell group t304: supervision timer started upon reconfiguration with sync and upon expiry UE declares a handover/reconfiguration with sync failure.

rach-ConfigDedicated: Random access configuration to be used for the reconfiguration with sync (e.g. handover). The UE performs the RA according to these parameters in the firstActiveUplinkBWP (see UplinkConfig).

Smtc: The SSB periodicity/offset/duration configuration of target cell for NR PSCell change, NR PCell change and NR PSCell addition. The network sets the periodicityAndOffset to indicate the same periodicity as ssb-periodicityServingCell in spCellConfigCommon. For case of NR PCell change and NR PSell addition, the smtc is based on the timing reference of (source) PCell. For case of NR PSCell change, it is based on the timing reference of source PSCell. If the field is absent, the UE uses the SMTC in the measObjectNR having the same SSB frequency and subcarrier spacing, as configured before the reception of the RRC message.

RACH Configuration

As in LTE, random access procedure is described in the NR MAC specifications and parameters are configured by RRC during a handover (RRCReconfiguration with reconfigurationWithSync). In NR, RACH configuration is within the uplinkConfigCommon information element (IE). The exact RACH parameters are within what is called initialUplinkBWP IE, since this is the part of the UL frequency the UE shall access and search for RACH resources.

Random Access Procedure in NR

Random access in LTE or NR may either be configured as contention-based random access (CBRA), and implying an inherent risk of collision, or contention-free, where resources are reserved by the network to a given UE at a given time.

In a CBRA procedure, a preamble is randomly chosen by the UE, which may result in more than one UE simultaneously transmitting the same signature, leading to a need for a subsequent contention resolution process. For some use cases where random access is used, e.g., handovers, the gNodeB has the option of preventing contention occurring by allocating a dedicated signature to a UE, resulting in contention-free access. This is faster than contention-based access—a particularly important factor for the case of handover, which is time-critical, though it requires the network to reserve resources, which may not be very efficient. In LTE, for example, a fixed number (64) of preambles is available in each LTE cell, and the operation of the two types of RACH procedure depends on a partitioning of these signatures between those for contention-based access and those reserved for allocation to specific UEs on a contention-free basis.

The CBRA procedure is summarized in FIG. 4. As shown in FIG. 4, the CBRA procedure includes four steps as follows.

Step-1: RACH preamble transmission. In the first step, the UE shall select a preamble to be transmitted. The UE selects one of the available preambles for CBRA (which is 64 minus the number of preambles reserved for CFRA). In LTE this maximum value is provided in as shown in Table 1 below in the rach-ConfigCommon IE:

TABLE 1

| rach-ConfigCommon: numberOfRA-Preambles IE | |
| --- | --- |
| numberOfRA-Preambles<br>n4, n8, n12, n16, n20, n24, n28,<br>n32, n36, n40, n44, n48, n52, n56,<br>n60, n64} | ENUMERATED { |

The set of contention-based signatures is further subdivided into two subgroups, so that the choice of signature can carry one bit of information relating to the amount of transmission resource needed to transmit the message at Step 3.

From an L1 perspective, the preamble is transmitted in the so-called Physical Random-Access Channel (PRACH), which is time- and frequency-multiplexed with PUSCH and PUCCH.

At the network side, these are the resources monitored to detect any RACH attempt. PRACH time-frequency resources are semi-statically allocated within the PUSCH region and repeat periodically.

Step-2: Reception of a RAR message with a temporary C-RNTI (Radio Network Temporary Identifier). In the second step, upon sending the preamble, the UE starts to monitor the reception of a Random-Access Response (RAR) message. That message is transmitted in the Physical Downlink Shared CHannel (PDSCH) and scheduled in the Physical Downlink Control Channel (PDCCH).

To detect and decode the RAR, the UE monitors the SpCell PDCCH identified by the RA-RNTI (e.g. instead of a C-RNTI, typically used for connected mode UEs to schedule data or control information on PDCCH/PDSCH). The exact RA-RNTI value used by the UE in this monitoring is known based on the selected preamble, as the RA-RNTI sent by the network unambiguously identifies which time-frequency resource was utilized by the MAC entity to transmit the RACH preamble. Hence, before the monitoring the UE performs a specified mapping between its selected PRACH resource(s) where the preamble was transmitted and the RA-RNTI to be monitored in the RAR window to decode its RAR.

FIG. 5 illustrates the structure of the MAC RAR.

Step-3: Message 3 with UE-identity on RRC. In the third step, the UE sends the so-called MSG3. That is the first scheduled uplink transmission on the PUSCH. It conveys the actual procedure message, such as an RRC connection request, RRC resume request, etc. It is addressed to the temporary C-RNTI allocated in the RAR at Step 2 and carries the C-RNTI or an initial UE identity. That message relies on HARQ retransmissions.

Step-4: Contention resolution. If for at least one of the UEs sending MSG3 it was possible to detect its content, properly acknowledged by the network with HARQ, in the fourth step, a contention resolution message is needed.

The contention resolution message also uses HARQ. It is addressed to the C-RNTI (if indicated in the MSG.3 message) or to the temporary C-RNTI (t-C-RNTI). In the latter case, the message echoes the UE identity contained in the RRC message (e.g. resume identifier, s-TMSI, etc.). The reason to distinguish these two cases is that if the UE is performing RACH during handover with CBRA, the target cell will allocate a C-RNTI in the handover command (prepared by target) which should have been a unique C-RNTI. Hence, as an indication that target detected the MSG.3 (in this example a RRCConfigurationComplete message), the MSG4 is sent to the same C-RNTI. The assumption is that the C-RNTI allocated by the target node is unique and there is no source of confusion, i.e., if another UE receives that message 4 with a C-RNTI that it does not recognize, it knows collision has happened.

Most of these procedures or at least are principles are the same in NR, so the following discussion focuses on some differences.

RACH Partitioning Per Beam (e.g. Per SSB) in NR

In NR, random access resource selection needs to be performed within a cell depending on measurements performed on SSBs or CSI-RSs, based on the RACH configuration. A cell in NR is basically defined by a set of these SSBs that may be transmitted in one or multiple downlink beams (typical implementation for lower frequencies e.g. below 6 GHz). For the same cell, these SSBs carry the same physical cell identifier (PCI) and a master information block (MIB). The RACH configuration, in the handover case provided in dedicated signaling, comprises a mapping between the detected SSB covering the UE at a given point in time and the PRACH configuration (e.g. time, frequency, preamble, etc.) to be used. For that, each of these beams may transmit its own SSB which may be distinguished by an SSB index, as shown in FIG. 1.

The mapping between RACH resources and SSBs (or CSI-RS) is also provided as part of the RACH configuration (in RACH-ConfigCommon). Two parameters are relevant here:

SSBs-per-PRACH-occasion: ⅛, ¼, ½, 1, 2, 8 or 16, which represents the number of SSBs per RACH occasion;

CB-preambles-per-SSB preambles to each SS-block: within a RACH occasion, how many preambles are allocated.

To give a first example, if the number of SSBs per RACH occasion is 1, and if the UE is under the coverage of a specific SSB e.g. SSB index 2, there will be a RACH occasion for that SSB index 2. If the UE moves and is now under the coverage of another specific SSB e.g. SSB index 5, there will be another RACH occasion for that SSB index 5, i.e. each SSB detected by a given UE would have its own RACH occasion. Hence, at the network side, upon detecting a preamble in a particular RACH occasion the network knows exactly which SSB the UE has selected and, consequently, which downlink beam is covering the UE, so that the network can continue the downlink transmission e.g. RAR, etc. That factor 1 is an indication that each SSB has its own RACH resource. i.e., a preamble detected there indicates to the network which SSB the UE has selected, i.e. which DL beam the network should use to communicate with the UE, such as the one to send the RAR.

FIGS. 6 and 7 illustrate mapping of SSB to RACH occasions.

Note that each SS-block (SSB, or SS/PBCH Block) typically maps to multiple preambles (different cyclic shifts and Zadoff-Chu roots) within a PRACH occasion, so that it is possible to have multiple different UEs in the same RACH occasions since they may be under the coverage of the same SSB. In a second example, shown below, the number of SSBs per RACH occasion is 2. Hence, a preamble received in that RACH occasion indicates to the network that one of the two beams are being selected by the UE. So either the network has means via implementation to distinguish these two beams and/or should perform a beam sweeping in the downlink by transmitting the RAR in both beams, either simultaneously or, transmitting in one, waiting for a response from the UE, and if absent, transmit in the other.

Contention-Free Random Access (CFRA) in NR and fallback to CBRA

In NR, as in LTE, the UE may be configured to perform CFRA e.g. during handovers. That configuration goes in the reconfigurationWithSync parameter of the IE ReconfigurationWithSync (which goes in the CellGroupConfig IE, transmitted in the RRCReconfiguration message).

One first difference between NR and LTE is that RACH resources may be mapped to beams (e.g. SSBs or CSI-RS resources that may be measured by the UE). Hence, when CFRA resources are provided they are also mapped to beams and there may be done only for a subset of beams in a given target cell.

The consequence is that to use CFRA resources the UE needs to select a beam for which it has CFRA resources configured in the dedicated configuration for the target cell, wherein the beams are associated to the target cell PCI. In the case of SSBs, for example, that may be found in the ssb-ResourceList parameter which is a SEQUENCE (SIZE(1 . . . maxRA-SSB-Resources)) OF CFRA-SSB-Resource.

To make an analogy with LTE, i.e., if the NR solution would have been the same as LTE, upon selecting a beam with CFRA resource (e.g. a beam from the configured list) and not receiving the RAR, the UE would keep selecting the same resource and ramp the power before retransmitting the preamble. However, as in the case of NR CBRA, the UE has the option upon every failed attempt to select another beam. And, that another beam may either be in the list of beams for CFRA or it may not. In the case the selected beam is not, the UE performs CBRA.

Also notice that there is a fallback between CSI-RS selection to SSB selection, in case CFRA is provided for CSI-RS resources.

The whole handover/reconfiguration with sync process for NR is captured in both RRC specifications [2] and the Medium Access Control (MAC) specifications [3], as shown in FIGS. 8 and 9.

The purpose of the procedure shown in FIGS. 8 and 9 is to modify an RRC connection, e.g. to establish/modify/release RBs, to perform reconfiguration with sync, to setup/modify/release measurements, to add/modify/release SCells and cell groups, to add/modify/release conditional handover configuration, to add/modify/release conditional PSCell change configuration. As part of the procedure, NAS dedicated information may be transferred from the Network to the UE.

RRC reconfiguration to perform reconfiguration with sync includes, but is not limited to, the following cases:
  reconfiguration with sync and security key refresh, involving RA to the PCell/PSCell, MAC reset, refresh of security and re-establishment of RLC and PDCP triggered by explicit L2 indicators; and
  reconfiguration with sync but without security key refresh, involving RA to the PCell/PSCell, MAC reset and RLC re-establishment and PDCP data recovery (for AM DRB) triggered by explicit L2 indicators.

SUMMARY

A method of operating a user equipment, UE, according to some embodiments may include receiving a handover, HO, command, to perform a handover to a target cell, wherein the HO command may include a mobility configuration associated to multiple physical cell identities, PCIs, for the target cell, and applying the HO command including the mobility configuration. For example, in some embodiments, the HO command includes a mobility configuration for lower layer mobility associated to multiple PCIs configured for the target cell, wherein the lower layer mobility is used to trigger a change of cell and/or PCI upon reception of a lower layer signaling. The lower layer signalling may include a MAC CE.

Some embodiments provide a user equipment, UE, including processing circuitry, and memory coupled with the processing circuitry, wherein the memory may include instructions that when executed by the processing circuitry causes the UE to perform operations according to any of the foregoing embodiments.

A user equipment, UE, according to some embodiments is adapted to perform according to any of the foregoing embodiments.

Some embodiments provide a computer program product including a non-transitory storage medium including program code to be executed by processing circuitry of a UE, whereby execution of the program code causes the UE to perform operations according to any of the foregoing embodiments.

Some embodiments provide a method of operating a first network node, including receiving a handover, HO, request from a second network node to handover a user equipment, UE, to the first network node, the HO request including measurement information associated to multiple PCIs associated to the first network node, generating a HO command that includes a mobility configuration for lower layer mobility associated to multiple PCIs configured for the first network node, and transmitting the HO command to the second network node for transmission to the UE. The lower layer mobility is used to trigger a change of cell or PCI upon reception of a lower layer signaling. The lower layer signalling may include a MAC CE.

A method of operating a second network node includes transmitting a handover, HO, request, to a first network node to handover a user equipment, UE, to the first network node. The HO request includes measurement information associated to at least multiple cells or multiple PCIs associated to the first network node based on measurements reported by the UE. The second network node receives a message from the first network node that includes a HO command that includes a mobility configuration for lower layer mobility associated to the multiple PCIs configured for the first network node, and transmits the HO command to the UE. The lower layer mobility is used to trigger a change of cell or PCI upon reception of a lower layer signaling. The lower layer signalling may include a MAC CE.

A network node (or RAN node) according to some embodiments includes processing circuitry, and memory coupled with the processing circuitry, wherein the memory may include instructions that when executed by the processing circuitry causes the RAN node to perform operations according to any of the foregoing embodiments.

Some embodiments provide a computer program product including a non-transitory storage medium including program code to be executed by processing circuitry of a radio access network, RAN, node, whereby execution of the program code causes the RAN node to perform operations according to any of the foregoing embodiments.

Embodiments described herein may provide certain advantages. For example, during a handover, a UE will become aware of the multiple PCI(s) for L1/L2 centric mobility during a mobility operation. Thus, the UE may not need to first access a target cell and then receive from the target network node an RRCReconfiguration including an L1/L2 centric mobility configuration. This may result in a reduction in signalling overhead, as there is no need for an additional RRCReconfiguration command to be sent from the network to the UE and/or to a reduction in latency to configure L1/L2 centric mobility during an RRC based handover.

Another benefit is increased mobility robustness. Thanks to the fact that the UE is configured in the HO command with random access configuration(s) with beams (mapped to random access resources) associated to more than one PCI and/or more than one cell, the UE has a higher degree of diversity to select a beam (i.e. a direction) to perform random access and select a target cell/TRP/PCI. For example, it could be the case that the radio environment has changed from the time the UE has transmitted a measurement report with measurement for multiple beams from multiple PCI(s)/cells (e.g. time t0), to the time the UE receives the HO command (time t1) and needs to perform random access. In other words, a best beam at time t0 (e.g. associated to PCI-x) may not be the best at time t1, or not even be a suitable beam. Hence, more beams network can configure for random access resource selection higher are the changes the UE will success with random access, hence the UE will succeed with the HO.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

L1/L2 centric mobility in Rel-17

3GPP is currently standardizing what is referred to as "L1/L2 centric inter-cell mobility" (or L1-mobility, inter-PCI TCI state change/update/modification, etc.). "L1/L2 centric inter-cell mobility" refers to mobility that is handled through L1/L2 signalling rather than L3 signalling.

The standardization of L1/L2 centric inter-cell mobility is justified in the Work Item Description (WID) RP-193133 (Further enhancements on MIMO for NR) by the fact that while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. That translates in the following objective:

1. Enhancement on multi-beam operation, mainly targeting FR2 while also applicable to FR1:
   a. Identify and specify features to facilitate more efficient (lower latency and overhead) DL/UL beam management to support higher intra- and L1/L2-centric inter-cell mobility and/or a larger number of configured TCI states:
      i. Common beam for data and control transmission/reception for DL and UL, especially for intra-band CA
      ii. Unified TCI framework for DL and UL beam indication
      iii. Enhancement on signaling mechanisms for the above features to improve latency and efficiency with more usage of dynamic control signaling (as opposed to RRC)
   b. Identify and specify features to facilitate UL beam selection for UEs equipped with multiple panels, considering UL coverage loss mitigation due to MPE, based on UL beam indication with the unified TCI framework for UL fast panel selection.

Figure 1:
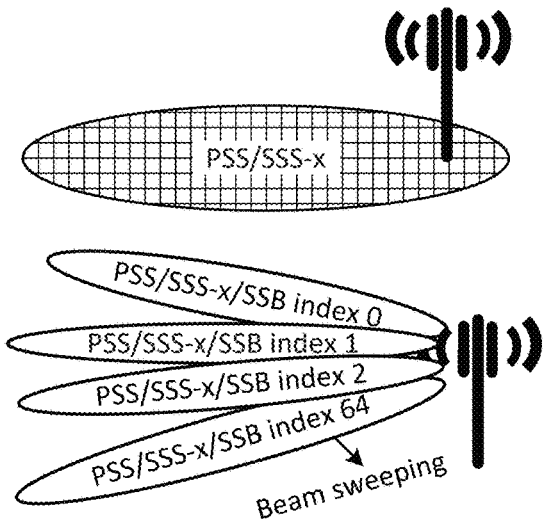
FIG. 1 illustrates PSS/SSS configurations in LTE and NR.
Figure 2:
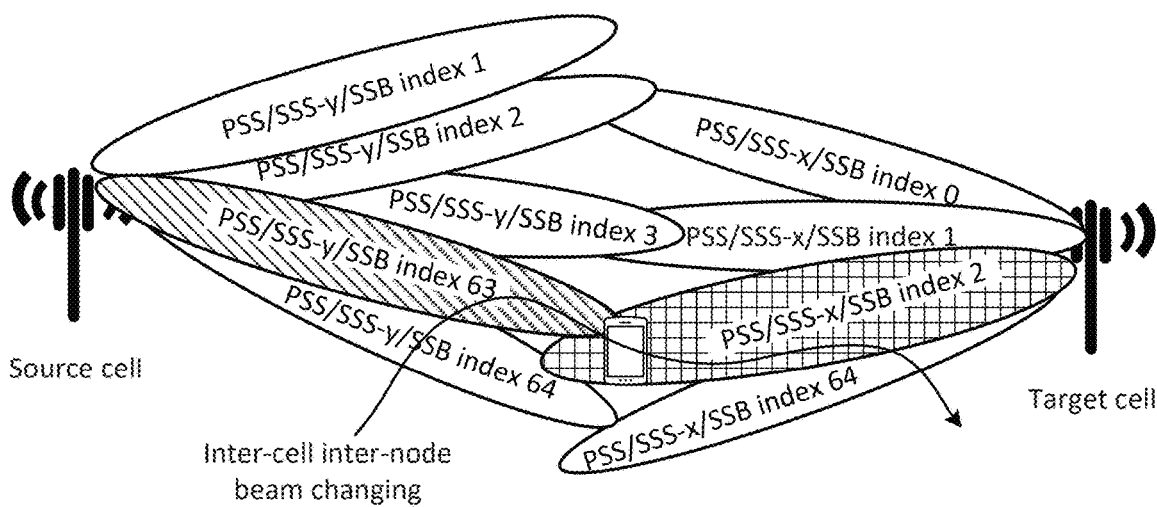
FIG. 2 illustrates inter-cell inter-node beam changing in NR.
Figure 3:
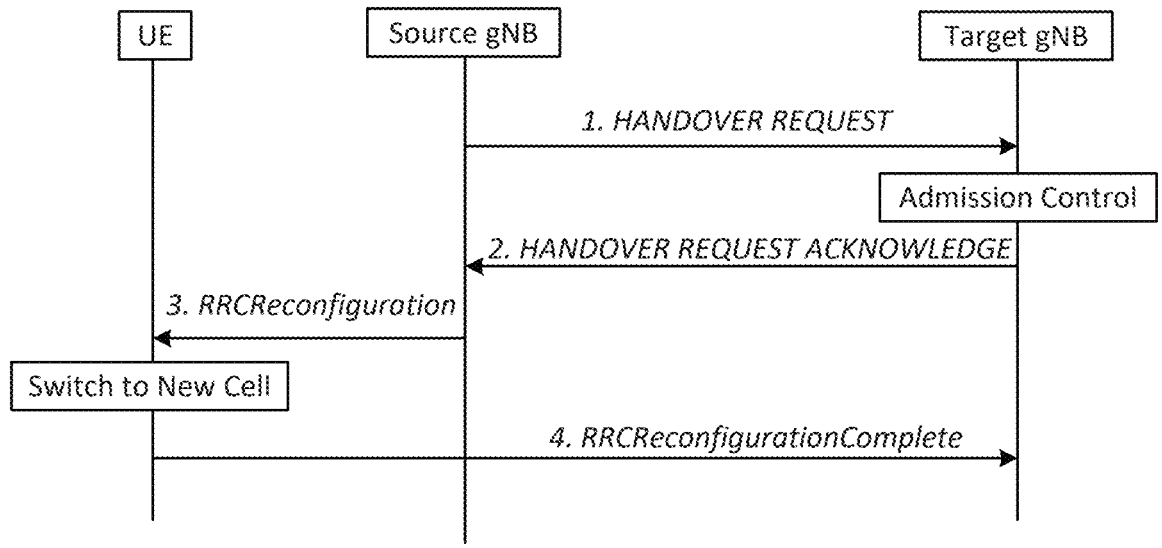
FIG. 3 illustrates a handover procedure for NR.
Figure 4:
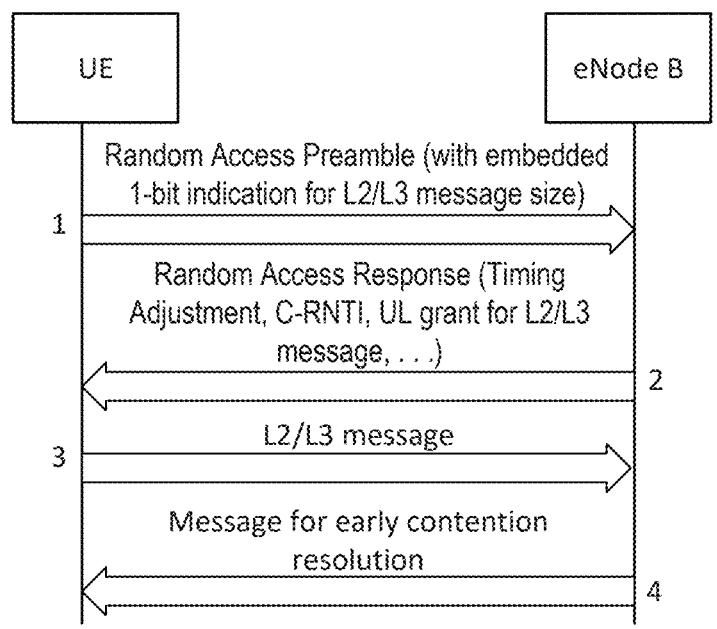
FIG. 4 illustrates a random access procedure.
Figure 5:
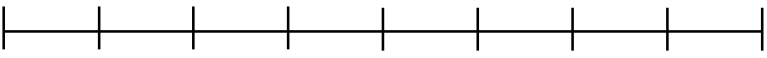
FIG. 5 illustrates a configuration of a random access response.
Figure 6:
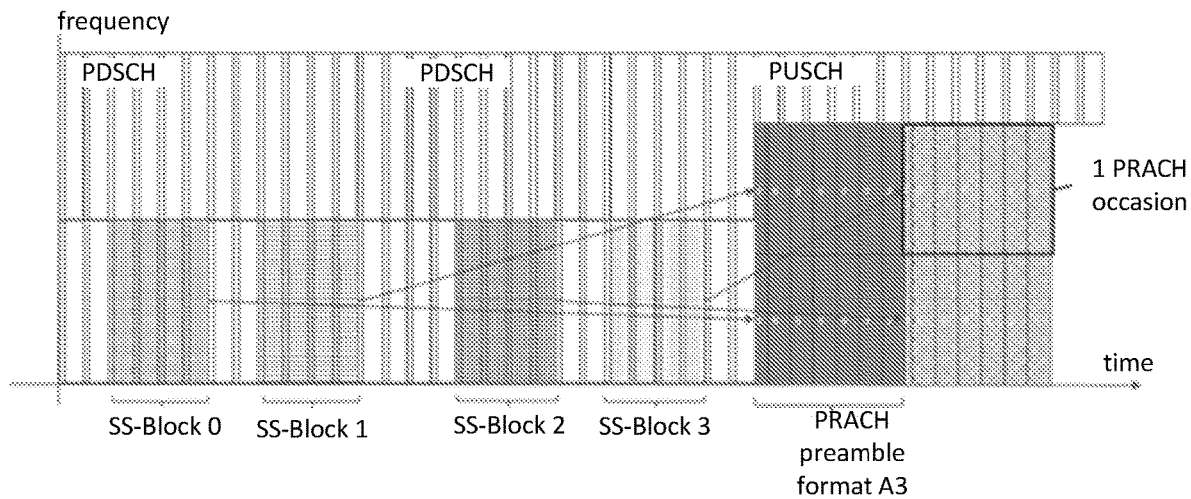
FIGS. 6 and 7 illustrate mapping of SSB to RACH occasions.
Figure 7:
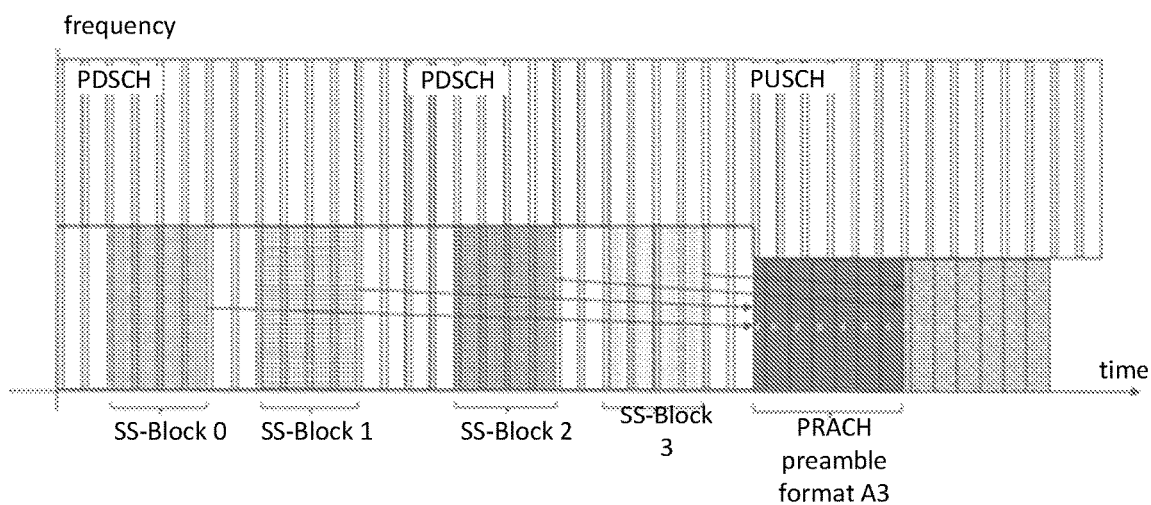
Figure 8:
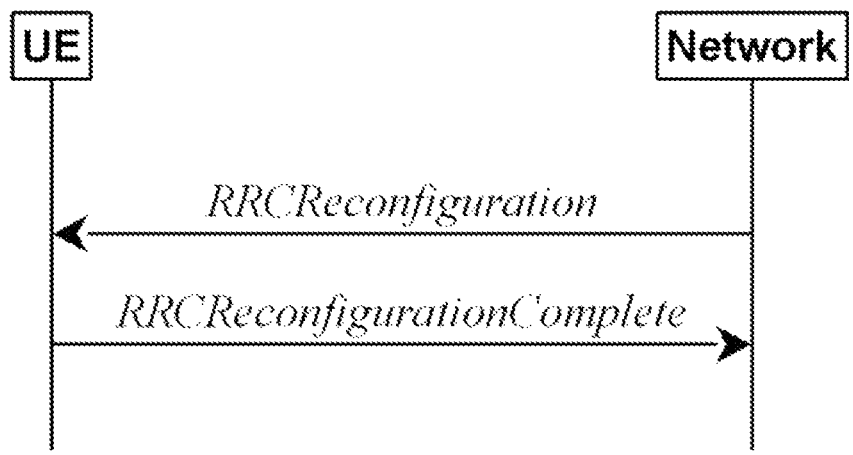
FIG. 8 illustrates RRC reconfiguration procedures.
Figure 9:
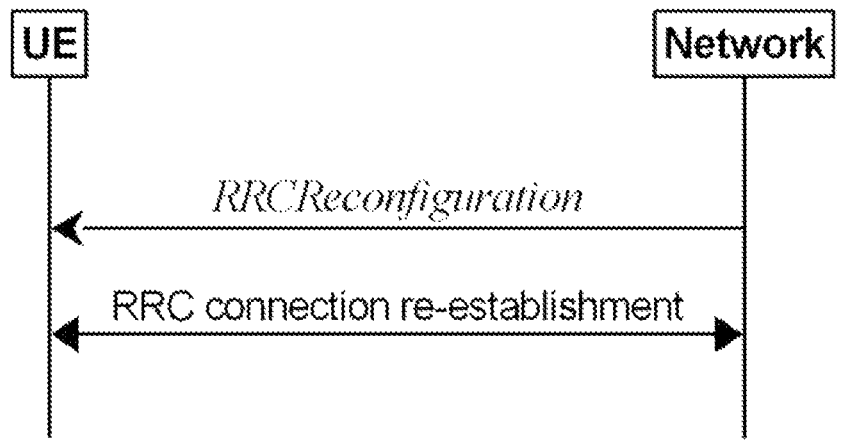
FIG. 9 illustrates RRC connection reestablishment procedures.
Figure 10:
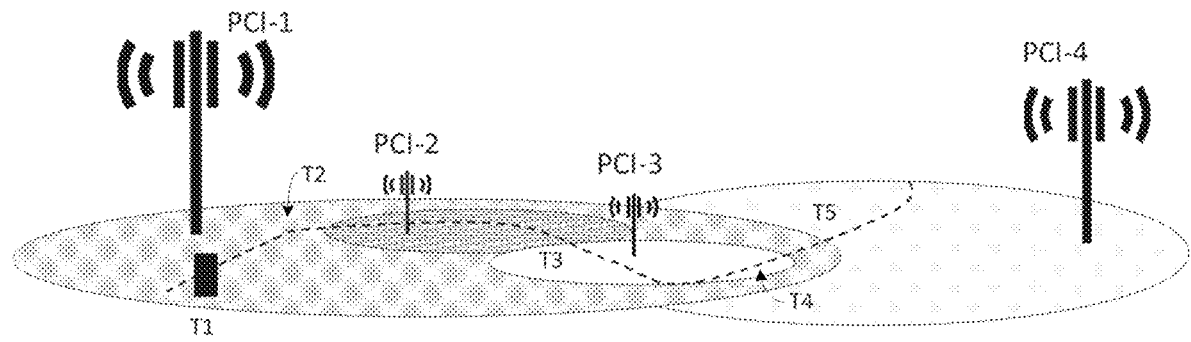
FIG. 10 illustrates L1/L2 centric inter-cell mobility.

In this disclosure, L1L2 inter-cell mobility should be understood that the UE receives a L1/L2 signaling (instead of RRC signaling) indicating a Transmission Configuration Indicator (TCI) state (e.g. for PDCCH) possibly associated to an SSB whose PCI is not necessarily the same as the PCI of the cell the UE has connected to e.g. via connection resume or connection establishment, as shown in FIG. 10. In other words, in the context of this disclosure, the L1/L2-centric inter-cell mobility procedure can be interpreted as a beam management operation expanding the coverage of multiple SSBs associated to multiple PCIs (e.g. possibly associated to the same cell or different cells).

In Rel-16, the L1 mobility including multiple PCIs has been discussed but nothing has been specified. In particular, RAN2 has discussed how to enable mPDCCH mTRP support in higher layers. It was proposed to add a list of additional SSBs (including PCI) in ServingCellConfig; and add a reference to one entry of that list in QCL-Info (only included when the reference is SSB).

It is likely that in Rel-17, one of the above may be considered as the baseline. Further, it has been proposed that multiple sets of SSBs may be provided, where each set has its independent PCI configured for the UE, in serving cell configuration. A fundamental aspect here is that under a serving cell, a unique SSB can be indicated by the pair {SSB index and PCI} compared to Rel.-15 where only SSB index was used to address a unique SSB.

If L1/L2-centric mobility is available for a capable UE within an area covered by a set of PCIs e.g. PCI-1, PCI-2, PCI-3, PCI-4, the UE can rely on beam management procedures, i.e. L1 measurements/reporting and MAC CE/DCI indications (or any other lower layer signaling like in RLC, MAC or PHY layers in the protocol stack).

However, this area will most likely not be "infinite" e.g. possibly this would be an area within the control of the same distributed unit (DU) and/or common baseband pool. And, in practice, there will be deployments like islands wherein the feature is supported i.e. a set of areas, where each area comprises a set of PCIs where the UE can perform L1/L2-centric mobility. Hence, two scenarios that are relevant for the scope of the present disclosure are the following:

First scenario: An RRC_CONNECTED UE within a first area for which L1/L2-centric mobility is supported (and being configured with L1/L2-centric mobility within this first area) moves towards a second area for which L1/L2-centric mobility is also supported e.g. but it is controlled by another DU or Baseband Unit (BBU);

Second scenario: An RRC_CONNECTED UE within a first area for which L1/L2-centric mobility is NOT supported (i.e. NOT configured with L1/L2-centric mobility within this first area) moves towards a second area for which L1/L2-centric mobility is supported;

In both scenarios the point is that the UE moves towards an area for which L1/L2-centric mobility is supported (neighbor area). The term "moves" indicate mobility but fundamentally it means the UE can detect cells/beams of that second area, and possibly trigger measurement report (e.g. based on A3 events).

Figure 11:
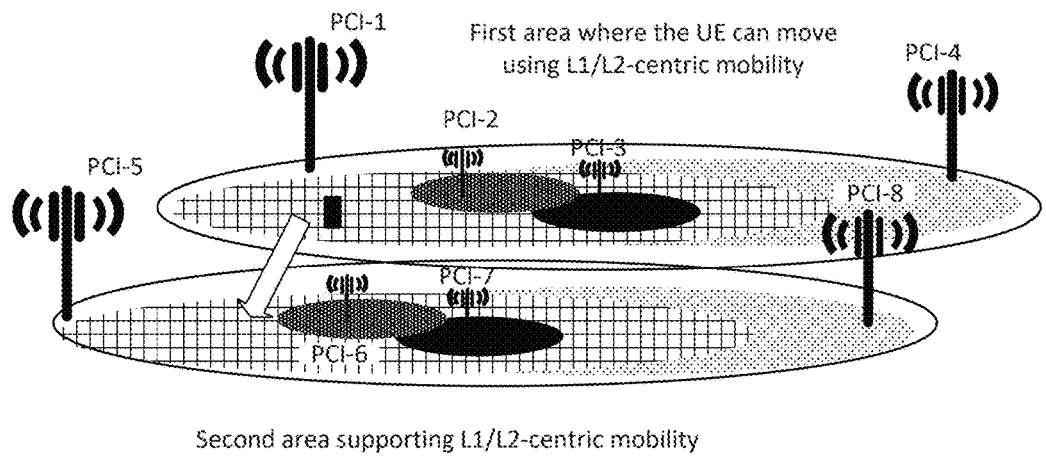
FIGS. 11 and 12 illustrate scenarios in which an RRC connected UE moves into an area in which L1/L2 centric mobility is supported.
Figure 12:
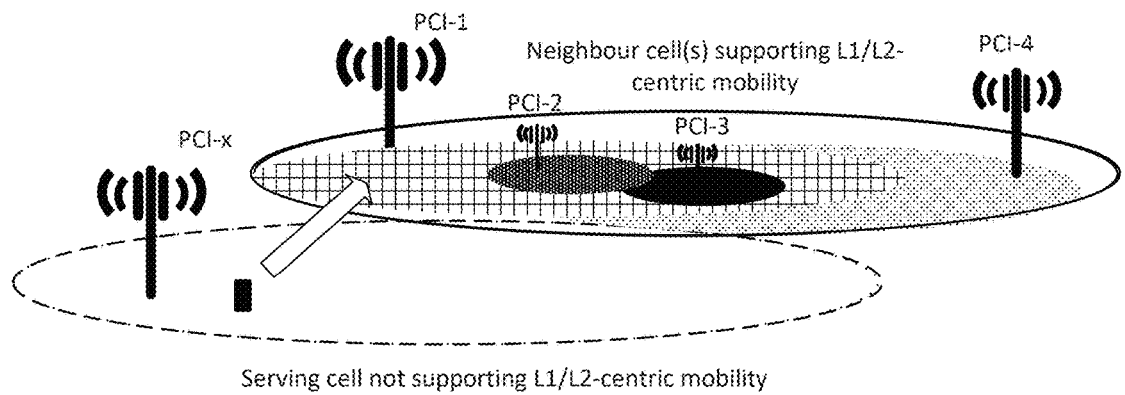

FIG. 11 illustrates the first scenario, and FIG. 12 illustrates the second scenario.

In legacy handover and/or in reconfiguration with sync, a legacy UE considers one PCI for a target PCell during handover to a given frequency. In other words, a single PCI is associated with the target PCell (whose cell-specific configuration is provided within ServingCellConfigCommon). That is the PCI in ServingCellConfigCommon (field physCellId of IE PhysCellId). Random Access configuration (for contention based random access) is also provided in ServingCellConfigCommon (within the uplinkConfigCommon), as shown in Table 2 below:

TABLE 2

| ServingCellConfigCommon IE | | |
|---|---|---|
| ServingCellConfigCommon ::= physCellId | SEQUENCE { PhysCellId | OPTIONAL, -- Cond HOAndServCellAdd, |
| downlinkConfigCommon -- Cond HOAndServCellAdd | DownlinkConfigCommon | OPTIONAL, |
| uplinkConfigCommon | UplinkConfigCommon | OPTIONAL, -- Need M |
| supplementaryUplinkConfig | UplinkConfigCommon | OPTIONAL, -- Need S |
| [...] } | | |

In other words, in previous approaches, for accessing the target cell during a handover (i.e. RRC based, reconfiguration with sync), the UE relies on a one-to-one association between a unique PCI per frequency (for a properly configured network i.e. without risks of PCI collision) and the target cell. If this legacy approach is used for a UE capable of L1/L2-centric mobility performing a handover to a target cell associated to an area for which it is possible to perform L1/L2-centric mobility (e.g. to a cell belonging to a set of cells or PCI wherein the UE can perform L1/L2-centric mobility), the UE would obtain sub-optimal performance.

Figure 13:
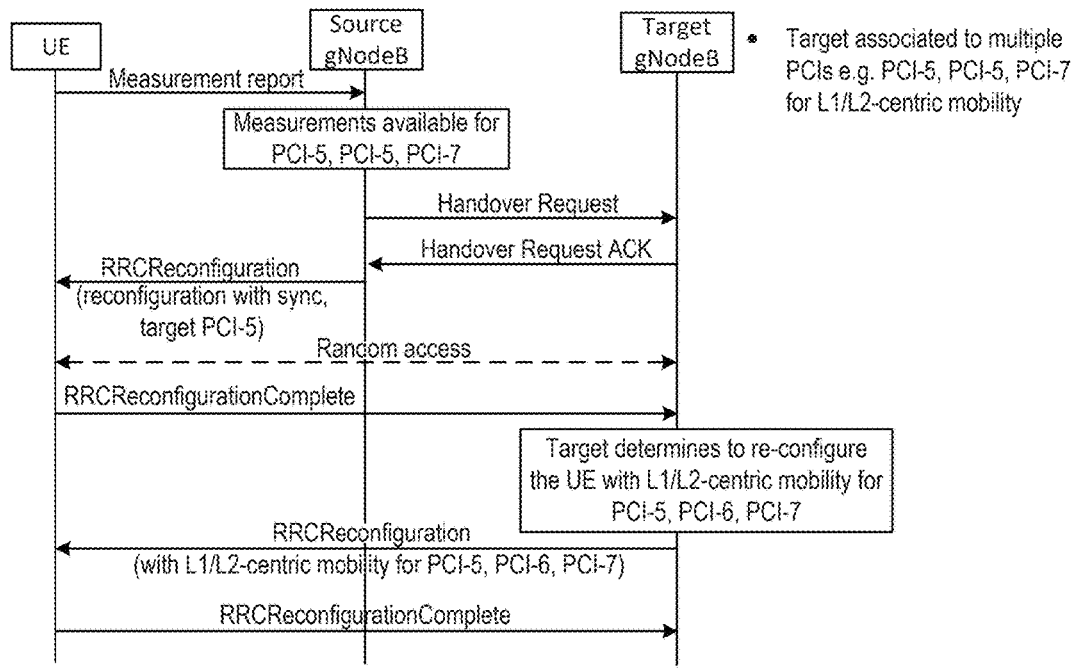
FIG. 13 illustrates conventional signalling for supporting L1/L2 centric mobility.

First, the signaling to configure L1/L2-centric mobility in the target cell is inefficient. In the best of the cases, the UE would first access the target cell, e.g. via the SSBs associated to the unique PCI of that target cell and transmit an RRCReconfigurationComplete. Then, the target node needs to re-configure the UE once more, i.e. the UE receives another RRCReconfiguration containing the L1/L2-centric mobility configuration and transmits an RRCReconfigurationComplete. This is illustrated in FIG. 13.

Second, by using a single PCI associated to the target cell during handover/reconfiguration with sync, the UE wastes the opportunity given by the fact that a target cell may be associated to multiple PCIs the UE could connect to, as these are handled by a single DU and/or baseband. Or, by considering a single cell for SSB selection during random access upon handover, the UE wastes the opportunity given by the fact that the UE would later be connected to multiple cells (e.g. a serving cell set) for L1/L2 centric mobility, as these are handled by a single DU and/or baseband.

Figure 14:
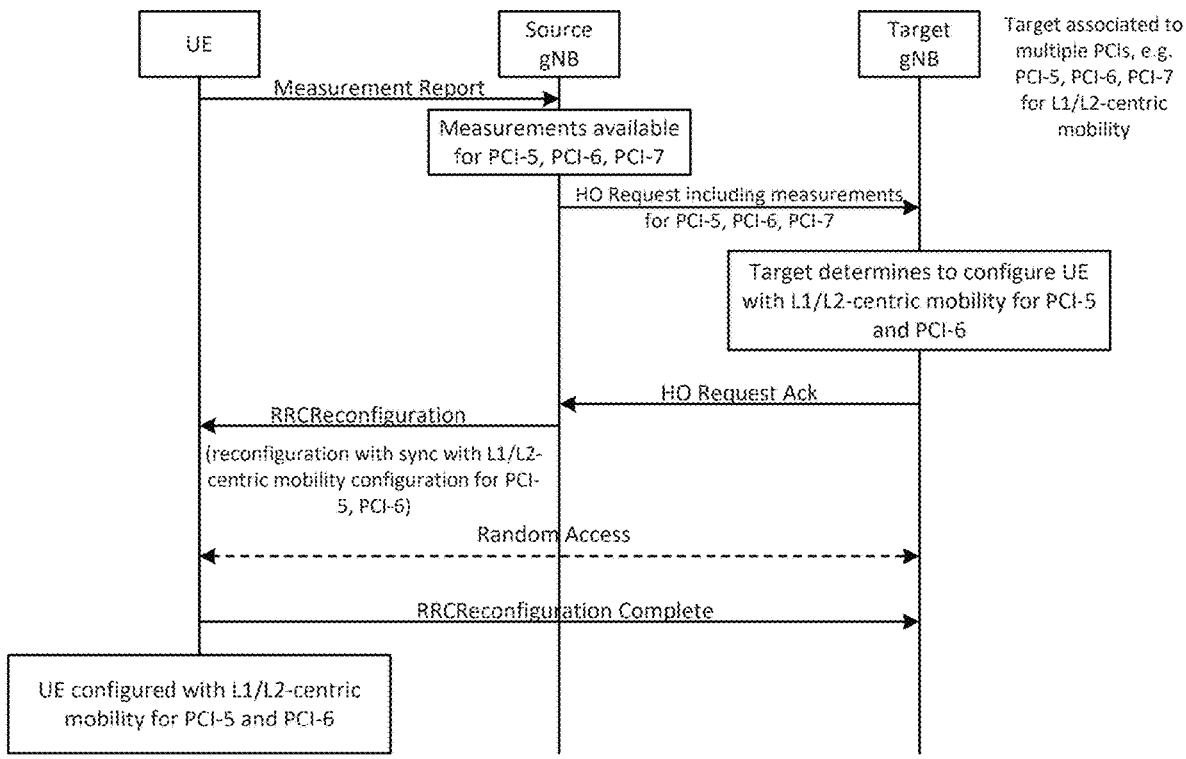
FIG. 14 illustrates signalling for supporting L1/L2 centric mobility according to some embodiments.

The present inventive concepts provide a method at a wireless terminal (e.g., a User Equipment, or UE). Referring to FIG. 14, a UE sends a measurement report to a source gNB indicating that measurements are available for multiple PCIs (PCI-5, PCI-6, PCI-7). The source gNB sends a handover request to a target gNB including the measurements for the multiple PCIs. The target gNB determines to configure the UE for L1/L2-centric mobility for PCI-5 and PCI-6 by preparing a HO command with a configuration for L1/L2-centric mobility for PCI-5 and PCI-6, which is included in the HO acknowledgement. The source gNB then sends an RRCReconfiguration message to the UE with the configuration for L1/L2-centric mobility for PCI-5 and PCI-6. Following a random access procedure to the target node, the UE is configured with and applies the configuration for L1/L2-centric mobility for PCI-5 and PCI-6.

The present disclosure uses the terminology in the NR specification as examples and refers to the corresponding Rel-17 features. However, it will be appreciated that this feature may also be applicable in the context of other standards, such as 6G, which is often labelled as Distributed-MIMO (D-MIMO) and cell-less mobility.

The term "beam" used herein can correspond to a reference signal that is transmitted in a given direction. For example, it may refer to an SS/PBCH Block (SSB) or layer 3 configured CSI-RS in the following sub-section. During a half-frame, different SSBs may be transmitted in different spatial directions (i.e. using different beams, spanning the coverage area of a cell). That corresponds to different SSBs meaning different beams.

Figure 15:
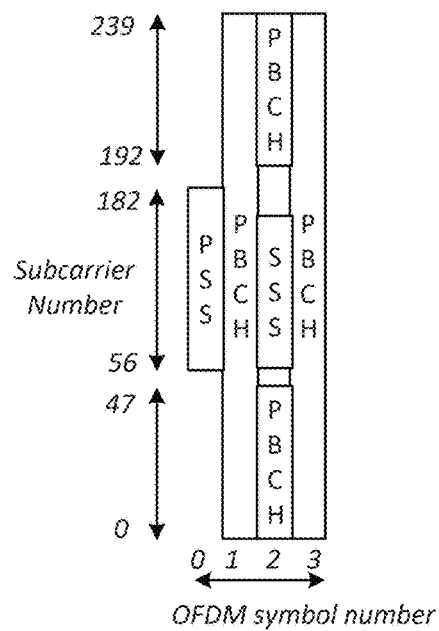
FIG. 15 illustrates an arrangement of SSS and PBCH blocks in a system bandwidth.

The terms PCI and/or PCI of an SSB correspond to the physical cell identity encoded by a PSS and a SSS that are included in an SSB, as shown in FIG. 15, and as defined in [4], wherein the PSS and SSS encode a PCI.

The present disclosure mentions "cells" or a "set of cells" wherein the UE can be configured with to perform L1/L2 centric mobility. These set of cells may be called a set of intra-frequency neighbor cells the UE can perform measurements on and can perform a handover/reconfiguration with sync to, or a set of intra-frequency non-serving cells or simply a set of non-serving cells.

The term "random access resource selection" can correspond to a beam selection procedure, wherein the UE selects an SSB and/or a CSI-RS that maps to a PRACH resource for preamble transmission. That can correspond to a procedure to be defined in [3] (5.1.2 Random Access Resource selection). That may include, for example, the UE selecting an SSB with SS-RSRP above rsrp-ThresholdSSB amongst the associated SSBs, wherein the associated SSBs can be associated to more than one physical cell identity (wherein an SS-RSRP is defined in [5]). That may include, e.g., the UE selecting an SSB with SS-RSRP above rsrp-ThresholdSSB amongst the associated SSBs, wherein the associated SSBs can be associated to more than one PCI and/or associated to multiple target cell(s) associated to set of cell(s).

Upon selecting a beam (e.g. SSB), the UE determines the next available PRACH occasion from the PRACH occasions corresponding to the selected SSB. That can be, for example, the ones permitted by the restrictions given by the ra-ssb-OccasionMaskIndex if configured (e.g., the MAC entity shall select a PRACH occasion randomly with equal probability amongst the consecutive PRACH occasions according to clause 8.1 of [5], corresponding to the selected SSB; the MAC entity may take into account the possible occurrence of measurement gaps when determining the next available PRACH occasion corresponding to the selected SSB). Then, the UE perform the Random Access Preamble transmission procedure. The configurations that are used e.g. for PRACH, are the ones associated to the selected SSB and/or PCI of the selected SSB.

When ASN.1 encoding (for the examples showing signaling), consider [2] Rel-16 specifications for RRC as a reference for the omitted IEs and field in the messages and/or IEs that are proposed to be extended to implement the systems/methods disclosed herein.

Figure 16:
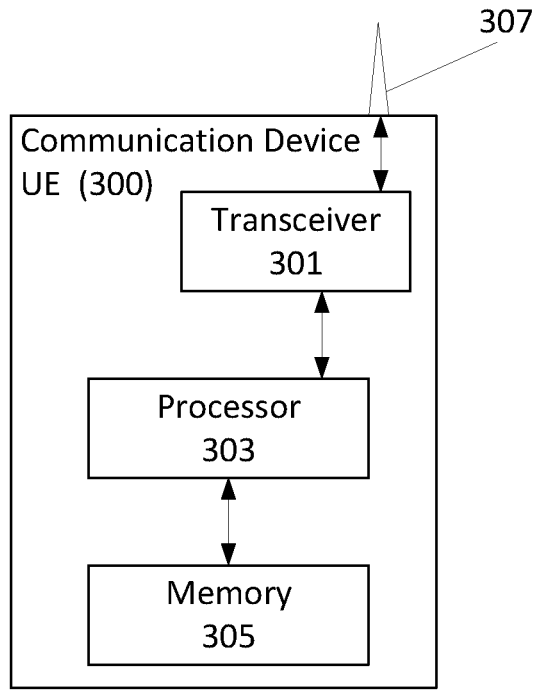
FIG. 16 is a block diagram illustrating a wireless device (UE) according to some embodiments.

FIG. 16 is a block diagram illustrating elements of a communication device (UE) 300 (also referred to as a mobile terminal, a mobile communication terminal, a wireless device, a wireless communication device, a wireless terminal, mobile device, a wireless communication terminal, a user equipment node/terminal/device, etc.) configured to provide wireless communication according to embodiments of inventive concepts. As shown, the UE may include an antenna 307 and transceiver circuitry 301 including a transmitter and a receiver configured to provide uplink and downlink radio communications with a base station(s) of a radio access network. The UE may also include processing circuitry 303 coupled to the transceiver circuitry, and memory circuitry 305 coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. The UE may also include an interface (such as a user interface) coupled with processing circuitry 303, and/or the UE may be incorporated in a vehicle.

As discussed herein, operations of a UE 300 may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. According to some embodiments, a UE 300 and/or an element(s)/function(s) thereof may be embodied as a virtual node/nodes and/or a virtual machine/machines.

Figure 17:
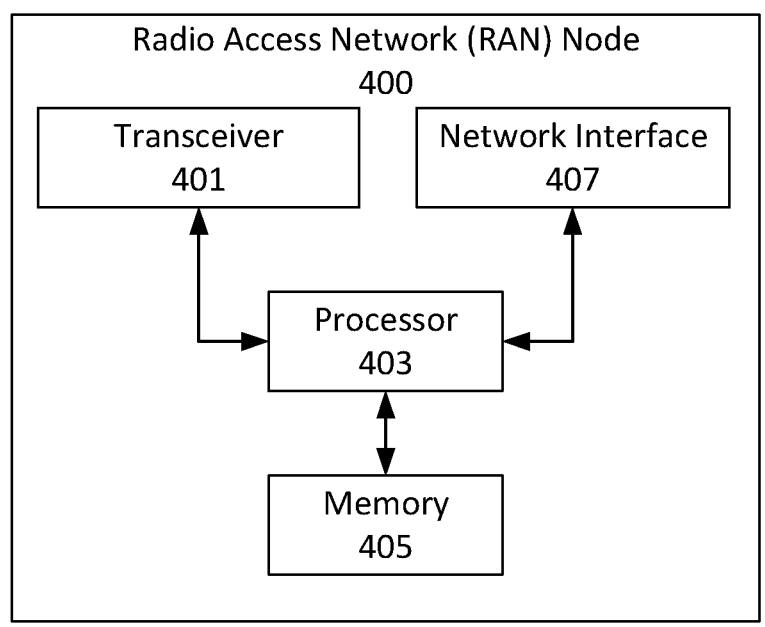
FIG. 17 is a block diagram illustrating a radio access network RAN node (e.g., a base station eNB/gNB) according to some embodiments.

FIG. 17 is a block diagram illustrating elements of a radio access network RAN node 400 (also referred to as a network node, base station, eNodeB/eNB, gNodeB/gNB, etc.) of a RAN configured to provide cellular communication according to embodiments of inventive concepts. As shown, the RAN node may include transceiver circuitry 401 including a transmitter and a receiver configured to provide uplink and downlink radio communications with mobile terminals. The RAN node may include network interface circuitry 407 configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more UEs and/or to receive uplink communications through transceiver 401 from one or more UEs over a radio interface. Similarly, processing circuitry 403 may control network interface 407 to transmit communications through network interface 407 to one or more other network nodes and/or to receive communications through network interface from one or more other network nodes. According to some embodiments, RAN node 400 and/or an element(s)/function(s) thereof may be embodied as a virtual node/nodes and/or a virtual machine/machines.

According to some other embodiments, a network node may be implemented as a core network CN node without a transceiver. In such embodiments, transmission to a UE 300 may be initiated by the network node so that transmission to the wireless communication device UE is provided through a network node including a transceiver (e.g., through a base station or RAN node). According to embodiments where the network node is a RAN node including a transceiver, initiating transmission may include transmitting through the transceiver.

Possible Approaches in 3GPP for L1/L2 Centric Mobility

In this disclosure, L1/L2 inter-cell mobility should be understood for the context of, for example, derivation of cell quality e.g. compute the RSRP of a serving cell) as the UE in RRC_CONNECTED is connected (i.e. being served by) to a serving cell, considered to be the PCell e.g. after the UE performs connection setup, if transitioning from RRC_IDLE to RRC_CONNECTED, or connection resume, transitioning from RRC_INACTIVE to RRC_CONNECTED, wherein the UE has a first PCI associated to that PCell i.e. the PCI in ServingCellConfigCommon/SIB1 for the cell the UE was camping on when it performed the random access for the transition to RRC_CONNECTED (e.g. denoted PCI-1). In the multi-beam scenario, a cell can be associated to multiple SSBs.

Even though the term "L1/L2 inter-cell centric mobility" has the term "inter-cell", a fundamental aspect is that a serving cell configuration has more than one PCI associated to it, and for that there are at least 2 approaches to create that association:

Approach 1) Intra-cell multi-PCI L1/L2 centric mobility, where same serving cell configuration is associated to more than one PCI (e.g. a Transmission Configuration Indicator (TCI) state configuration within the ServingCellConfig IE can be associated to a PCI, wherein that can be different from the PCI in the ServingCellConfigCommon IE). For handovers, as described herein, the implication is that a HO command can contain that L1/L2 mobility centric configuration (i.e. a ServingCellConfig IE with TCI states associated to PCI(s) that can be different from the PCI in the ServingCellConfigCommon IE) and/or a HO command can contain a random access configuration whose beams (e.g. SSBs and/or CSI-RS) are associated to multiple PCIs (while in prior art the SSBs and CSI-RS of a target cell in handover can only be the SSBs and CSI-RSs associated to the single target cell PCI in the ServingCellConfigCommon IE).

Approach 2) Inter-cell multi-PCI L1/L2 centric mobility, where UE has several serving cell configurations with respective PCIs associated but TCI state may refer to other cell PCIs (e.g. other serving cell or, even a non-serving cell the UE can move to with L1/L2 centric mobility). The implication related to the present disclosure is that the HO command contains a configuration prepared by a target node (e.g. a target gNB) that is associated to more than one cell (e.g. TCI state configurations can be associated to multiple cells' PCIs e.g. TCI state Id=1 associated to PCI-x of cell A, TCI state Id=2 associated to PCI-y of cell B, etc.). In other words, one implication for HOs is that a HO command can contain that L1/L2 mobility centric configuration and/or a HO command can contain a random access configuration whose beams (e.g. SSBs and/or CSI-RS) are associated to multiple cells (while in prior art the SSBs and CSI-RS of a target cell in handover can only be the SSBs and CSI-RSs associated to the single target cell PCI in ServingCellConfigCommon IE).

Approach 1) Intra-Cell Multi-PCI L1/L2 Centric Mobility

In a conventional approach, the UE can receive a MAC CE from the network to indicate the TCI state to be associated to a given PDCCH configuration, while PDSCH TCI state association can be provided via Downlink Control Indication (DCI). Upon reception the UE knows which TCI state (e.g. in which downlink beam PDCCH is being transmitted and should be monitored/received) is associated to a given PDCCH configured to be monitored. In other words, in a system where SS/PBSH Blocks (SSB)s are transmitted in different beams for a given cell with a given PCI, a TCI indication for a given PDCCH configuration triggers the UE to monitor PDCCH in a given beam of that cell associated to its PCI, in this case, a beam/SSB of the serving cell where that TCI state is configured.

However, for the Approach 1, for a given serving cell configuration, there can be a different PCI in a TCI state configuration compared to the PCI in ServingCellConfig-Common, e.g. PCI-1, which is an additional PCI e.g. PCI-2. In that case, the UE receiving the MAC CE needs to determine the PCI associated to the indicated TCI, to determine the SSB (or CSI-RS) associated, hence, determine the downlink beam. If it receives a TCI with PCI indicating PCI-2, for example, the UE needs to monitor PDCCH in a beam/SSB associated to PCI-2.

(Same cell, change PCI, similar ServingCellConfigCommon) In a first variant of Approach 1, the ServingCellConfigCommon before and after the TCI state indication associated to a different PCI than the one in ServingCellConfigCommon (e.g. PCI-2) remains the same, except for the PCI. Hence, the UE is still assumed to be in the same cell after the TCI state indication (e.g. MAC CE) whose TCI state has a different PCI associated to it (not necessarily signaled in the MAC CE, as the TCI state identifier in the MAC CE enables the UE to identify the associated PCI).

(Same cell, change PCI, ServingCellConfigCommon has some PCI-specific configuration(s)) In a second variant of Approach 1, the UE is configured with some PCI-specific configuration. In other words, the UE has a ServingCellConfigCommon, valid for the PCI indicated on it, but it contains some further PCI-specific configuration so that upon receiving an indication for a different PCI the UE switches configuration.

In this example, the UE may apply the new ServingCellConfigCommon (for the new PCI in the MAC CE) on top of the previous ServingCellConfigCommon (e.g. in a delta-signaling manner). That reduces the amount of signaling for the PCI-specific configurations, in case some of the configurations are the same). That can rely on a perPCIConfigList structure for the PCI(s) associated to L1/L2 centric mobility. An example of that configuration is shown in Table 3 below.

TABLE 3

| ServingCellConfigCommon IE |
| --- |
| ServingCellConfigCommon ::=    SEQUENCE {<br>physCellId                      PhysCellId   OPTIONAL,  -- Cond HOAndServCellAdd,<br>[...]<br>perPCIConfigList                SEQUENCE (SIZE (1..X)) OF ServingCellConfigCommon OPTIONAL, -- Need N<br>} |

Another way to configure the UE is that in serving cell config. the UE is configured with SSB sets that has other PCI associated to it. These SSB sets would have an index and in TCI state configuration an index of SSB set is referred to together with exact SSB beam index from that SSB set. It is possible these sets will be named differently to reflect "inter PCI candidates", thus SSB set index is an example of an RRC configuration specific ID given to the PCI(SSB set) to be used in the L1/L2 mobility in UE's current RRC configuration.

According to some embodiments, the UE is configured by a target network node during a handover/reconfiguration with sync with L1/L2 centric mobility configuration e.g. configuration associated to multiple PCI(s) e.g. PCI-5, PCI-7 for the target cell, i.e., the cell to be the serving cell. That means that after handover the UE would connect to that target cell, and it should be possible to perform L1/L2-centric mobility and/or the network could configure the UE to perform L1/L2-centric mobility when moving between e.g. PCI-5 and PCI-7, even though according to Approach 1 it is said that the UE would still have the same serving cell.

Approach 2) Inter-Cell Multi-PCI L1/L2 Centric Mobility

In a conventional approach, the UE assumes that the quasi co-located (QCL) source of a configured TCI state is a Reference Signal (RS) associated to the serving cell's single configured PCI (i.e. the PCI in the ServingCellConfigCommon IE). However, in Approach 2, the UE can be configured with a different PCI in the TCI state configuration wherein these PCIs are considered to be associated with different cells. That is, the UE can have different serving cell configurations for these PCIs.

The UE is configured with a list of TCI states, meaning that it is configured with a list of additional cells, as the different PCIs are PCIs of different cells (each TCI state has its own PCI, but the same PCI may be used by multiple TCI states). These could be considered as some kind of serving cells e.g. if these are all in the same frequency (like same ARFCN for their SSB) these could be considered as intra-frequency serving cells, where one is considered to be active at the time (except if some form of multi-TRP transmission is enabled).

According to some embodiments, the UE is configured by a target network node during a handover/reconfiguration with sync with L1/L2 centric mobility configuration e.g. configuration associated to multiple cells, each associated to its PCI e.g. cell-5→PCI-5, cell-6→PCI-6, cell-7→PCI-7, wherein multiple cells can form a group or set of cells for L1/2-centric mobility. That means that after handover the UE would connect to one of the cells, that will be considered the target cell (e.g. via handover, reconfiguration with sync), and it should be possible to perform L1/L2-centric mobility and/or the network could configure the UE to perform L1/L2-centric mobility when moving between these cells of the set of cells. That means that if the UE connects to one of these cells (e.g. via handover, reconfiguration with sync), like cell-6 of PCI-6, it should be possible to perform L1/L2-centric mobility and/or the network could configure the UE to perform L1/L2-centric mobility when moving between e.g. cell-5→PCI-5, cell-6→PCI-6, cell-7→PCI-7.

It will be understood that what is called "changing cell" or "inter-cell" herein does not have the same meaning as changing serving cell as in legacy.

Some embodiments provide methods for HO in a scenario where the UE and the network support the L1 mobility.

1. L1 Mobility Configuration Included in the HO Command.

In a serving cell configuration, the UE would receive the additional SSB/PCI possibly together with CSI-RS related to the additional SSB/PCIs. These can be for example directly in servingCell-Config IE. The IE CSI-measConfig can include a reference to the added SSB/PCI with the respective index to a specific SSB beam. Additionally, it may include references to the configured CSI-RS. If CSI-RS related to the other SSB/PCI are not configured in the servingCell-config, these may be configured. In PDSCH-config, the UE receives the lists of TCI states which may again have references to any of the RSs configured in one of the IEs in the serving cell configuration. Further, the UE receives the respective PDCCH and UL configurations accordingly.

In addition, PDCCH and PUCCH may have RRC configured initial TCI states UE would assume upon accessing the target cell.

It will be appreciated that these embodiments are not limited to a HO command but can describe also how a UE's L1 RRC configuration is organized.

In addition to the above configuration enabling the UE to directly operated in L1/L2 centric mobility in a target network node (e.g. in a target cell and/or in a set of target cell(s), the UE may be indicated the SSB/PCI and index of a specific SSB beam together with RACH resources for it, which the UE should first try to connect. The UE could additionally receive RACH resources for other SSB/PCI and there may be specific rules in which order the UE should consider these.

Operations of a user equipment UE 300 (implemented using the structure of FIG. 16) will now be discussed with reference to the flow chart of FIG. 18 according to some embodiments of inventive concepts. For example, modules may be stored in memory 305 of FIG. 16, and these modules may provide instructions so that when the instructions of a module are executed by respective UE processing circuitry 303, processing circuitry 303 performs respective operations of the flow chart.

Figure 18:
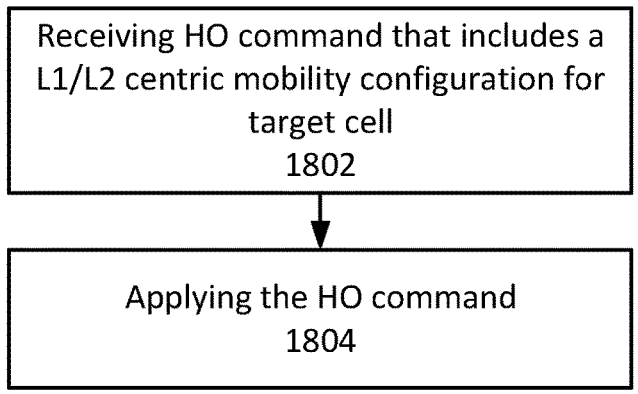
FIG. 18 is a flow chart illustrating operations of a user equipment according to some embodiments.

Referring to FIG. 18, a method of operating a user equipment, UE (300), includes receiving (1802) a handover, HO, command (e.g. an RRCReconfiguration message including a ReconfigurationWithSync IE for a Master Cell Group), to perform a handover to a target cell, wherein the HO command comprises a L1/L2-centric mobility configuration for the target cell, and applying (1804) the HO command including the L1/L2-centric mobility configuration. In particular, the HO command includes a mobility configuration for lower layer mobility associated to multiple physical cell identities, PCIs, configured for the target cell, wherein the lower layer mobility comprises a change of the target cell and/or PCI upon reception of a lower layer signaling. The lower layer signalling may include a MAC CE.

In one embodiment the HO command is an RRCReconfiguration message including a ReconfigurationWithSync IE, wherein the L1/L2-centric mobility configuration includes dedicated configuration(s), i.e. configurations applicable upon L1/L2 centric mobility, such as a MAC CE indicating a change of PCI or a change of cell for the UE.

In one embodiment the HO command is an RRCReconfiguration including a ReconfigurationWithSync IE, wherein the L1/L2-centric mobility configuration includes common configuration(s), i.e. configurations that needs to be applied upon the handover for the selection PCI and/or cell, and changed/updated upon L1/L2 centric mobility like a MAC CE indicating a change of PCI or a change of cell for the UE.

Examples of L1/L2-centric mobility configuration(s) are provided above, for the possible Approaches 3GPP may adopt for L1/L2-centric mobility.

L1/L2-centric mobility configuration(s) also include random access configurations, in the sense that the UE can perform random access resource selection based on beams associated to multiple PCI(s) and/or cells.

After performing random access with the target cell and after transmitting a Complete message (an RRCReconfigurationComplete message) the UE starts to perform procedures according to the L1/L2-centric mobility configuration.

In one embodiment, the method allows a L1/L2-centric mobility configuration(s) as a delta signalling, wherein the absence of a configuration in a given message means the UE shall keep using the stored configuration(s). For example, in case the UE is moving from an area with PCI-1, PCI-2 to an area with an overlapping PCIs, e.g., PCI-2, and PCI-5, the signaling may add PCI-5 and remove PCI-1, in a HO command, while PCI-2 (and associated configuration(s)) may remain intact at the UE. That can be useful e.g. if the UE has a limited number of PCIs and/or cells to support L1/L2 centric mobility so that as the UE moves at some point the network updates the list with RRC signaling for that (even if the UE is still moving between cells of the same DU and/or BBU. That may rely on a AddMod list structure for adding TCI states associated to different PCI(s) and/or ServingCellConfigCommon IE(s), for per-PCI and/or per-cell configuration(s).

In one embodiment, the UE receives in the HO command a CFRA configuration associated to a plurality of beams (e.g. SSBs, CSI-RSs, or a combination of SSBs and CSI-RSs), wherein each beam may be associated to a different PCI (or a different cell) e.g. beam-1 (e.g. SSB-1) associated to PCI-5 (and/or cell-5), beam-2 (e.g. SSB-2) associated to PCI-6 (and/or cell-6), beam-3 associated to PCI-7 (and/or cell-7). If Approach 1 is adopted, this is one of the PCI's of the target cell. If Approach 2 is adopted, this is one of the cells that can be accessed during the handover.

In one example, there are a set of common random-access parameters considered for the different PCIs (and/or for the different cells), but the SSBs and/or CSI-RS resources can be defined in the configuration per PCI (and/or per cell). Thus, while in prior art a resource index (SSB index/identifier, CSI-RS index/identifier) was provided so the PCI for that resource index was considered to be the PCI in the ServingCellConfigCommon IE within a Reconfiguration-WithSync IE (field physCellId of IE PhysCellId), according to this example, a PCI (a field physCellId witin RACH-COnfigDedicated) can be provided for each SSB and/or CSI-RS to be selected upon random access. One possible advantage is that most of the CFRA configuration remains the same, except that the UE can select a beam from a set of beams associated to different PCIs (and/or cells while in prior art all beams that may be accessed are associated to a single PCI and/or single cell, i.e., the PCI of the target cell, configured in ServingCellConfigCommon). An example of ASN.1 encoding is shown in Table 4 below (consider [2] as a reference for the omitted IEs and field).

TABLE 4

| RACH-ConfigDedicated IE |
|---|
| -- ASN1START |
| -- TAG-RACH-CONFIG-DEDICATED-START |
| RACH-ConfigDedicated ::=    SEQUENCE { |
|   cfra    CFRA OPTIONAL, -- Need S |
|   ra-Prioritization    RA-Prioritization    OPTIONAL, -- Need N |
|   ... |
| } |
| CFRA ::=    SEQUENCE { |
|   occasions    SEQUENCE { |
|     rach-ConfigGeneric    RACH-ConfigGeneric, |
|     ssb-perRACH-Occasion    ENUMERATED {oneEighth, oneFourth, oneHalf, one, two, four, eight, sixteen} OPTIONAL -- Cond SSB-CFRA |
|   }    OPTIONAL, -- Need S |
|   resources    CHOICE { |
|     ssb    SEQUENCE { |
|       ssb-ResourceList    SEQUENCE (SIZE(1..maxRA-SSB-Resources)) OF CFRA-SSB-Resource, |
|       ra-ssb-OccasionMaskIndex    INTEGER (0..15) |
|     }, |
|     csirs    SEQUENCE { |
|       csirs-ResourceList    SEQUENCE (SIZE(1..maxRA-CSIRS-Resources)) OF CFRA-CSIRS-Resource, |
|       rsrp-ThresholdCSI-RS    RSRP-Range |
|     } |
|   }, |
|   ..., |
|   [[ |
|   totalNumberOfRA-Preambles-v1530 INTEGER (1..63)    OPTIONAL -- Cond Occasions |
|   ]] |
| } |
| CFRA-SSB-Resource ::=    SEQUENCE { |
|   ssb    SSB-Index, |
|   ra-PreambleIndex    INTEGER (0..63), |
|     physCellId    PhysCellId    OPTIONAL -- |
| } |
| CFRA-CSIRS-Resource ::=    SEQUENCE { |
|   csi-RS    CSI-RS-Index, |
|   ra-OccasionList    SEQUENCE (SIZE(1..maxRA-OccasionsPerCSIRS)) OF INTEGER (0..maxRA-Occasions–1), |
|   ra-PreambleIndex    INTEGER (0..63), |
|     physCellId    PhysCellId    OPTIONAL -- |
| } |
| -- TAG-RACH-CONFIG-DEDICATED-STOP |
| -- ASN1STOP |

In another example, the UE receives multiple instances of CFRA configuration(s) (e.g. listRach-ConfigDedicatedPer-PCI and/or per cell) each instance associated to a PCI and/or a cell (e.g. Rach-ConfigDedicatedPerPCI). If Approach 1 is adopted, this is one of the PCI's of the target cell. If Approach 2 is adopted, this is one of the cells that can be accessed during the handover. Each instance of CFRA is provided per PCI, within the ReconfigurationWithSync IE. In this example, the UE considers the PCI for each SSB and/or CSI-RS during beam selection (i.e. random access resource selection) the PCI within the instance of the CFRA configuration wherein the resources are configured (e.g. SSB index and/or CSI-RS index). An example of ASN.1 encoding is shown in Table 5 below (consider [2] as a reference for the omitted IEs and field).

TABLE 5

| ReconfigurationWithSync IE | | | |
|---|---|---|---|
| ReconfigurationWithSync ::= | SEQUENCE { | | |
| spCellConfigCommon | ServingCellConfigCommon | OPTIONAL, | -- Need M |
| newUE-Identity | RNTI-Value, | | |
| t304 | ENUMERATED {ms50, ms100, ms150, ms200, ms500, ms1000, ms2000, ms10000}, | | |
| rach-ConfigDedicated | CHOICE { | | |
| uplink | RACH-ConfigDedicated, | | |
| supplementary Uplink | RACH-ConfigDedicated | | |
| } | | OPTIONAL, | -- Need N |
| ..., | | | |
| listRach-ConfigDedicatedPerPCI | | SEQUENCE (SIZE(1..K1)) OF Rach-ConfigDedicatedPerPCI | |
| Rach-ConfigDedicatedPerPCI ::= | SEQUENCE { | | |
| physCellId | | PhysCellId | |
| rach-ConfigDedicated | CHOICE { | | |
| uplink | RACH-ConfigDedicated, | | |
| supplementary Uplink | RACH-ConfigDedicated | | |
| } | | OPTIONAL, | -- Need N |
| } | | | |
| [[ | | | |
| smtc | SSB-MTC | OPTIONAL | -- Need S |
| ]], | | | |
| [[ | | | |
| daps-UplinkPowerConfig-r16 | DAPS-UplinkPowerConfig-r16 | OPTIONAL | -- Need N |
| ]] | | | |
| } | | | |

In one embodiment the UE receives in the HO command a CBRA configuration associated to a plurality of beams (e.g. SSBs, CSI-RSs, or a combination of SSBs and CSI-RSs), wherein each beam may be associated to a different PCI e.g. beam-1 associated to PCI-5, beam-2 associated to PCI-6, beam-3 associated to PCI-7.

In a conventional approach, CBRA configuration is provided within the ServingCellConfigCommon IE, wherein the beams that may be selected during random access, to be mapped to random access resources for preamble transmissions, are associated to the PCI configured in the ServingCellConfigCommon IE. However, according to the method, CBRA configuration(s) wherein beams to be selected and mapped to random access resources for preamble transmissions are received in at least one of the following:

Multiple instances of ServingCellConfigCommon configurations (list-spCellConfigCommon of IE SEQUENCE (SIZE(1 . . . K1)) OF ServingCellConfigCommon), one per PCI the UE can access in the handover e.g. within ReconfigurationWithSync, as shown in Table 6 below.

TABLE 6

| ReconfigurationWithSync IE | | |
|---|---|---|
| ReconfigurationWithSync ::= | SEQUENCE { | |
| spCellConfigCommon | ServingCellConfigCommon | OPTIONAL, -- Need M |
| list-spCellConfigCommon ServingCellConfigCommon | | SEQUENCE (SIZE(1..K1)) OF |
| newUE-Identity | RNTI-Value, | |
| t304 ms10000}, | ENUMERATED {ms50, ms100, ms150, ms200, ms500, ms1000, ms2000, | |
| rach-ConfigDedicated | CHOICE { | |
| uplink | RACH-ConfigDedicated, | |
| supplementaryUplink | RACH-ConfigDedicated | |
| } | | OPTIONAL, -- Need N |
| ..., | | |
| [[ | | |
| smtc | SSB-MTC | OPTIONAL -- Need S |
| ]], | | |
| [[ | | |
| daps-UplinkPowerConfig-r16 | DAPS-UplinkPowerConfig-r16 | OPTIONAL -- Need N |
| ]] | | |
| } | | |

In one option, a UE supporting this feature may ignore the field spCellConfigCommon and only use the list-spCellConfigCommon. Another option is that the UE considers the list-spCellConfigCommon as the list of additional configurations for the additional PCIs, but still considers spCellConfigCommon as one of these configurations. In yet another option, the UE considers the list-spCellConfigCommon as the list of additional configurations for the additional PCIs, while still considers spCellConfigCommon as the high priority or main of these configurations. There can be further UE actions taking that into account such as first try to access the beams associated to the high priority PCI/ServingCellConfigCommon configuration.

Within ServingCellConfigCommon, there may be multiple instances of the UplinkConfigCommon IE, each associated to a PCI (which would lead to RACH configurations, one per PCI; Beams within are associated to that PCI) as shown in Table 7.

Within ServingCellConfigCommon, and within the RACH configuration, for each beam there can be a configured PCI (that is not necessarily the same as the PCI within ServingCellConfigCommon).

Multiple instances of ReconfigurationWithSync IEs ServingCellConfigCommon configurations (list-spCellConfigCommon of IE SEQUENCE (SIZE(1 . . . K1)) OF ServingCellConfigCommon), one per PCI and/or cell the UE can access in the handover e.g. within ReconfigurationWithSync; in that case, there would be an instance of timer T304 value for each PCI and/or cell that could be accessed; hence, upon selecting an SSB the UE determines the PCI and/or cell associated and applies the associated configuration e.g. starts the timer T304 with a value within that configuration.

2. UE Actions when Performing HO to a Cell Supporting L1 Mobility

When the UE is accessing the target cell, there could be predetermined configuration for the UE to perform CFRA

TABLE 7

| ServingCellCommonConfig IE | | |
|---|---|---|
| ServingCellConfigCommon ::= | SEQUENCE { | |
| physCellId HOAndServCellAdd, | PhysCellId | OPTIONAL, -- Cond |
| downlinkConfigCommon HOAndServCellAdd | DownlinkConfigCommon | OPTIONAL, -- Cond |
| uplinkConfigCommon | UplinkConfigCommon | OPTIONAL, -- Need M |
| list-uplink ConfigCommon UplinkConfigCommonPerPCI | | SEQUENCE (SIZE(1..K1)) OF |
| UplinkConfigCommonPerPCI ::= | SEQUENCE { | |
| physCellId | | PhysCellId |
| uplinkConfigCommon | UplinkConfigCommon | OPTIONAL, -- Need M |
| } | | |
| supplementaryUplinkConfig | UplinkConfigCommon | OPTIONAL, -- Need S |
| [...] | | |
| } | | |

Within ServingCellConfigCommon, there may be multiple instances of RACH configurations, one per PCI; Beams within are associated to that PCI.

Within ServingCellConfigCommon, and within the RACH configuration, there can be configurations of beams per PCI.

where the UE has received the predetermined RACH resources and may have a specific configuration or rules in which order to attempt the access.

In one embodiment, the UE performs a random access procedure based on the CFRA configuration, the procedure including the UE performing a random access resource selection (i.e. selecting resources for transmission of a preamble) based on one of the configured beams (e.g. SSBs, CSI-RSs, or a combination of SSBs and CSI-RSs) e.g. UE selects a beam in the CFRA configuration, and determines the resource associated to the selected beam to transmit a preamble. The UE transmits the preamble, receives a RAR, and transmits the RRC Reconfiguration Complete. As described above there could be different rules and/or configuration(s) determining how the UE performs CFRA when resources associated to multiple PCIs and/or multiple cells are configured, for example, at least one of the following:

Prioritize the CFRA for the main PCI and/or main cell, which can be indicated in the RACH dedicated configuration or that is the PCI and/or cell indicated in servingCellConfigCommon;

Select any SSB and/or CSI-RS (according to other conditions e.g. above an RSRP threshold) associated to any of the configured PCIs and/or configured cells;

Select an SSB and/or CSI-RS (according to other conditions e.g. above an RSRP threshold) according to an order of priority for the different PCIs and/or different cells. For example, if HO command has configured PCI-5, PCI-6 and PCI-7, and beams associated for random access for each of these PCIs and/or cells, and each of them have different priorities, the UE should start by trying to select the beams associated with the PCI and/or cell with highest priority.

In one embodiment the UE performs a random access procedure based on the CBRA configuration, the procedure including the UE performing a random access resource selection (i.e. selecting resources for transmission of a preamble) based on one of the configured beams (e.g. SSBs, CSI-RSs, or a combination thereof) e.g. UE selects a beam in the CBRA configuration, and determines the resource associated to the selected beam to transmit a preamble. The UE transmits the preamble, receives a RAR, and transmits the RRC Reconfiguration Complete.

In another embodiment the UE is configured with both CFRA configuration and CBRA configuration, wherein at least one of the configuration(s) contain beam(s) to be selected (for random access resource selection/mapping) associated to different PCIs and/or cells, and performs random access resource selection according to at least one of the rules:

the UE tries to select a beam above a threshold amongst the beams associated to a high priority PCI and/or cell within CFRA configuration; if not possible (e.g. no suitable beam, no beam above a configurable threshold, wherein configuration may also be per PCI and/or per cell), the UE selects a beam associated to a high priority PCI and/or cell within CBRA configuration; if not possible (e.g. no suitable beam, no beam above a configurable threshold, wherein configuration may also be per PCI and/or per cell), the UE selects a beam associated to a lower priority PCI and/or cell with a CFRA configuration; If not possible (e.g. for the same reasons as above), the UE selects a beam associated to a lower priority PCI within a CBRA configuration;

the UE tries to select any beam above the threshold amongst the beams within CFRA configuration, associated to any of the configured PCIs and/or cell; If not possible, UE selects any beam within CBRA, associated to any of the PCIs and/or cell; For this example, a procedure is provided in section 5.1.2 of [3].

Note: when the text above says "If not possible" it means the UE has not found a suitable beam (according to the rule) above a configured threshold. A "beam above a threshold" means a beam measurement (e.g. SS-RSRP, for an RSRP measurement based on an SSB) being above a threshold (e.g. an RSRP threshold for an SS-RSRP measurement).

The method includes the configuration of a threshold, as described above. In conventional approaches, there is one threshold for beam selection based on SSB (e.g. valid for both CBRA and CFRA) and one threshold for beam selection for CSI-RS (valid for CFRA). According to the some embodiments, a different granularity can be defined for configuring the threshold for beam selection during random access, also per RS type (i.e. per SSB and CSI-RS), and per PCI and/or per cell that can be accessed/selected for RA. The threshold may include at least one of the following:

A threshold per SSB per PCI and/or cell. while current systems have only one SSB RSRP threshold defined (as there is a single PCI configured), according to some embodiments there can be one SSB RSRP threshold per PCI and/or cell, as there can be different PCIs and/or cells associated to the multiple SSBs; In one option, that is valid for CBRA and CFRA.

A threshold per CSI-RS per PCI and/or per cell. while current systems have only one CSI-RS RSRP threshold defined (as there is a single PCI configured), according to some embodiments there can be one CSI-RS RSRP threshold per PCI and/or cell, as there can be different PCIs and/or cells associated to the multiple CSI-RS resources. A threshold can be valid for CFRA.

A threshold per PCI and/or cell for both CBRA and CFRA.

A threshold per PCI and/or cell for CBRA and a threshold per PCI and/or cell for CFRA.

In another embodiment, after beam selection, the UE selects a RAR associated to that selected beam. That selection can be done according to at least one of the following:

Each set of RACH resources (e.g. for preamble transmission) is associated to a configured PCI and/or cell. Hence, if the UE selects a beam associated to a PCI and/or cell, the UE determines the resources to transmit the preamble associated to the PCI and/or cell associated to the selected beam e.g. PCI included in the selected SSB.

A common set of RACH resources (e.g. for preamble transmission) is associated to all configured PCIs. Hence, if the UE selects a beam associated to a PCI and/or cell, the UE determines the resources to transmit the preamble associated to the configured PCIs associated to the selected beam e.g. PCI and/or cell included in the selected SSB.

In another variant, the UE does not receive predetermined RACH resources, or receives these in the serving cell config common only for the initial or main SSB/PCI. Depending on whether this is the case or not, the UE may initially choose whether to perform CFRA for the given resources or CBRA to a beam selected by the UE. There may be specific rules how to select the beam. For example, to select the best beam, or select a beam that is above a threshold.

Further Examples of L1/L2 Centric Mobility Configuration

Further examples will now be described of what can be called L1/L2 centric mobility configuration (that is, the configuration to be included in the HO command according to some embodiments), for a UE to perform L1/L2 centric mobility procedures after a handover.

In one example, the L1/L2 centric mobility configuration includes a list of TCI states configuration(s), wherein a TCI state configuration can be associated to an indication of a PCI, as shown in Table 8 and Table 9.

TABLE 8

TCI-state Information Element

```
-- ASN1START
-- TAG-TCI-STATE-START
TCI-State ::=         SEQUENCE {
   tci-StateId        TCI-StateId,
   qcl-Type1          QCL-Info,
   qcl-Type2          QCL-Info          OPTIONAL,   -- Need R
   ...
}
QCL-Info ::=          SEQUENCE {
   cell               ServCellIndex     OPTIONAL,   -- Need R
   bwp-Id             BWP-Id            OPTIONAL,   -- Cond CSI-RS-Indicated
   referenceSignal    CHOICE {
      csi-rs          NZP-CSI-RS-ResourceId,
      ssb             SSB-Index
   },
   pci                PhysCellId                                OPTIONAL,  -- Need R
   qcl-Type           ENUMERATED { typeA, typeB, typeC, typeD},
   ...
}
...
}
-- TAG-TCI-STATE-STOP
-- ASN1STOP
PhysCellId information element
-- ASN1START
-- TAG-PHYSCELLID-START
PhysCellId ::=        INTEGER (0..1007)
-- TAG-PHYSCELLID-STOP
-- ASN1STOP
```

TABLE 9

QCL-Info Field Descriptions
QCL-Info field descriptions bwp-Id
The DL BWP which the RS is located in.
cell
The UE's serving cell in which the referenceSignal is configured. If the field is absent, it applies to the serving cell in which the TCI-State is configured. The RS can be located on a serving cell other than the serving cell in which the TCI-State is configured only if the qol-Type is configured as typeC or typeD. See TS 38.214 [19] clause 5.1.5. In a handover, that can be considered the target SpCell.
referenceSignal
Reference signal with which quasi-collocation information is provided as specified in TS 38.214 [19] subclause 5.1.5.
qcl-Type
QCL type as specified in TS 38.214 [19] subclause 5.1.5.
pci
The Physical Cell Identity associated to that RS for the TCI state being configured.

In another example, the L1/L2 centric mobility configuration includes PCI-specific configuration(s) for at least one PCI being configured for L1/L2-centric mobility. For example, in the IE ServingCellConfigCommon within the ReconfigurationWithSync IE the UE receives, there is a list of additional ServingCellConfigCommon IEs, one per possible PCI the UE is configured with, as show in Table 10 below.

TABLE 10

ReconfigurationWithSync IE and ServingCellConfigCommon IE

```
ReconfigurationWith Sync ::=   SEQUENCE {
   spCellConfigCommon           ServingCellConfigCommon      OPTIONAL, -- Need M
   [...]
}
[...]
ServingCellConfigCommon ::=    SEQUENCE {
   physCellId                   PhysCellId                                OPTIONAL, -- Cond HOAndServCellAdd,
   [...]
   perPCIConfigList             SEQUENCE (SIZE (1..X)) OF ServingCellConfigCommon OPTIONAL, -- Need N
}
```

When the UE receives that in the HO command it means that the UE applies the configurations within the main ServingCellConfigCommon except the ones in perPCIConfigList (these configurations are stored and only applied upon reception of a MAC CE). Then, after the handover, upon reception of a MAC CE indicating a change to PCI-x, the UE applies the ServingCellConfigCommon within perPCIConfigList associated to PCI-x.

Another option for implementing this example is shown below, wherein these per PCI-configuration(s) are within ReconfigurationWithSync, but provided as a list of ServingCellConfigCommon IEs, one per PCI, as shown in Table 11:

TABLE 11

| ReconfigurationWithSync IE |
| --- |
| ReconfigurationWithSync ::= SEQUENCE {<br>  spCellConfigCommon    ServingCellConfigCommon    OPTIONAL, -- Need M<br>[...]<br>  perPCIConfigList    SEQUENCE (SIZE (1..X)) OF ServingCellConfigCommon OPTIONAL, -- Need N<br>} |

When the UE receives that in the HO command it means that the UE applies the configurations within the spCellConfigCommon, but it does not apply perPCIConfigList (these configurations are stored and only applied upon reception of a MAC CE). Then, after the handover, upon reception of a MAC CE indicating a change to PCI-x, the UE applies the ServingCellConfigCommon within perPCIConfigList associated to PCI-x. That helps the UE to avoid the acquisition of at least some system information upon L1/L2 centric mobility indicating a change of PCI.

In another example, the L1/L2 centric mobility configuration includes cell-specific configuration(s) for at least one cell being configured for L1/L2-centric mobility. For example, in the IE ServingCellConfigCommon within the ReconfigurationWithSync IE the UE receives, there is a list of additional ServingCellConfigCommon IEs, one per possible cell the UE is configured with, as show in Table 12 below:

TABLE 12

| ReconfigurationWithSync IE and ServingCellConfigCommon IE |
| --- |
| ReconfigurationWithSync ::= SEQUENCE {<br>  spCellConfigCommon    ServingCellConfigCommon    OPTIONAL, -- Need M<br>[ ... ]<br>}<br>[ ... ]<br>ServingCellConfigCommon ::= SEQUENCE {<br>  physCellId    PhysCellId    OPTIONAL, -- Cond HOAndServCellAdd,<br>[ ... ]<br>  perCellConfigList    SEQUENCE (SIZE (1..X)) OF ServingCellConfigCommon OPTIONAL, -- Need N<br>} |

When the UE receives that in the HO command it means that the UE applies the configurations within the main ServingCellConfigCommon except the ones in perCellConfigList (these configurations are stored and only applied upon reception of a MAC CE). Then, after the handover, upon reception of a MAC CE indicating a change to cell-x (e.g. for PCI-x), the UE applies the ServingCellConfigCommon within perCellConfigList associated to cell-x (of PCI-x).

Another option for implementing this example is shown below, wherein these per cell-configuration(s) are within ReconfigurationWithSync, but provided as a list of ServingCellConfigCommon IEs, one per cell, as shown in Table 13 below:

TABLE 13

Reconfiguration WithSync IE

```
Reconfiguration With Sync ::=   SEQUENCE {
    spCellConfigCommon          ServingCellConfigCommon       OPTIONAL,   -- Need M
    [...]
    perCellConfigList           SEQUENCE (SIZE (1..X)) OF ServingCellConfigCommon
        OPTIONAL,   -- Need N
}
```

When the UE receives that in the HO command it means that the UE applies the configurations within the spCellConfigCommon, but it does not apply perCellConfigList (these configurations are stored and only applied upon reception of a MAC CE). Then, after the handover, upon reception of a MAC CE indicating a change to cell-x, the UE applies the ServingCellConfigCommon within perCellConfigList associated to cell-x. That helps the UE to avoid the acquisition of at least some system information upon L1/L2 centric mobility indicating a change of cell to cell-x.

In the previous example, the UE receives multiple ServingCellConfigCommon IEs in the HO command Each of these ServingCellConfigCommon IEs contains configuration(s) for a CBRA procedure. During random access the UE can select a beam e.g. an SSB, and determine to which cell that beam is associated e.g. by determining the PCI of the selected SSB. And, depending on selected SSB/Cell, the UE determines which ServingCellConfigCommon to apply to continue with the CBRA procedure and the handover procedure. The handling for CBRA configurations can be different as they can be outside ServingCellConfigCommon and within the ReconfigurationWithSync (or at least parts of the CFRA configuration(s) e.g. the list of candidate beams, the dedicated preambles, etc.).

In another example, a L1/L2 centric mobility configuration includes dedicated configuration(s). For example, they can be provided within cell group configuration, as a configuration of a set of cells, wherein each cell in the set has at least one field within the IE SpCellConfig. The spCellConfig of IE SpCellConfig is to be applied upon reception of the RRCReconfiguration, so the UE acts accordingly upon the handover. However, one of the other configurations e.g. an element of setOfCellsConfig, is to be applied upon reception of a MAC CE changing the cell with L1/L2 centric mobility. That allows the network to change the dedicate SpCellConfig using the L1/L2 centric mobility mechanism. These configurations are shown in Table 14 below:

TABLE 14

CellGroupConfig IE

```
CellGroupConfig ::=   SEQUENCE {
[ ... ]
    spCellConfig         SpCellConfig                OPTIONAL,   -- Need M
    sCellToAddModList    SEQUENCE (SIZE (1..maxNrofSCells)) OF SCellConfig
        OPTIONAL,   -- Need N
    setOfCellsConfig     SEQUENCE (SIZE (1..K)) OF SpCellConfig OPTIONAL,   -- Need N
[...]
}
```

One option related to the example is that upon reception of that configuration in a HO command, the UE deletes the previous list (configuration for the set of cells before the handover, in case the was also configured with L1/L2 centric mobility before the handover).

Further examples of L1/L2 centric configuration(s), to be included in the HO command according to the method, are provided below.

Table 15 shows an example, where both SSB/PCI and related CSI-RSs are configured directly in ServingCellConfig:

TABLE 15

| ServingCellConfig IE | | |
|---|---|---|
| ServingCellConfig ::= | SEQUENCE { | |
| [...] | | |
| ]], | | |
| [[ | | |
| l1MObility-r17 | SetupRelease { L1Mobility-r17 } | |
| ]] | | |
| } | | |
| L1Mobility ::= | SEQUENCE { | |
|   physicalCellId-r17 | PhysCellId, | |
|   ssb-IndexNcell-r17 | SSB-Index | OPTIONAL, -- Need S |
|   ssb-Configuration-r17 | SSB-Configuration-r17 | OPTIONAL -- Need S |
| subcarrierSpacing | SubcarrierSpacing, | |
|   csi-RS-CellList | SEQUENCE (SIZE (1..maxNrofCSI-RS)) OF CSI-RS-L1MObility, | |
| } | | |
| CSI-RS-L1MObility ::= | SEQUENCE { | |
|   cellId | PhysCellId, | |
|   csi-rs-MeasurementBW | SEQUENCE { | |
|     nrofPRBs | ENUMERATED { size24, size48, size96, size192, size264}, | |
|     startPRB | INTEGER(0..2169) | |
|   }, | | |
|   density | ENUMERATED {d1,d3} | OPTIONAL, -- Need R |
|   csi-rs-ResourceL1List | SEQUENCE (SIZE (1..maxNrofCSI-RS)) OF CSI-RS-ResourceL1 | |
| } | | |
| CSI-RS-ResourceL1 ::= | SEQUENCE { | |
|   csi-RS-Index | CSI-RS-Index, | |
|   slotConfig | CHOICE { | |
|     ms4 | INTEGER (0..31), | |
|     ms5 | INTEGER (0..39), | |
|     ms10 | INTEGER (0..79), | |
|     ms20 | INTEGER (0..159), | |
|     ms40 | INTEGER (0..319) | |
|   }, | | |
|   associatedSSB | SEQUENCE { | |
|     ssb-Index | SSB-Index, | |
|     isQuasiColocated | BOOLEAN | |
|   } | | OPTIONAL, -- Need R |
|   frequencyDomainAllocation | CHOICE { | |
|     row1 | BIT STRING (SIZE (4)), | |
|     row2 | BIT STRING (SIZE (12)) | |
|   }, | | |
|   firstOFDMSymbolInTimeDomain | INTEGER (0..13), | |
|   sequenceGenerationConfig | INTEGER (0..1023), | |
| } | | |

In a variant, these can be given in the measObjectNR which is included in the servingcellConfig as shown in Table 16 below.

TABLE 16

| measObjectNR IE | | |
|---|---|---|
| MeasObjectNR ::= | SEQUENCE { | |
| [...] | | |
|   rmtc-Config-r16 | SetupRelease {RMTC-Config-r16} | OPTIONAL, -- Need M |
|   t312-r16 | SetupRelease { T312-r16 } | OPTIONAL -- Need M |
|   ]], | | |
| [[ | | |
| l1MObility-r17 | SetupRelease { L1Mobility-r17 } | |

TABLE 16-continued measObjectNR IE

```
]]
  }
}
L1Mobility ::=   SEQUENCE {
  physicalCellId-r17              PhysCellId,
  ssb-IndexNcell-r17              SSB-Index                    OPTIONAL, -- Need S
  ssb-Configuration-r17           SSB-Configuration-r17        OPTIONAL -- Need S
subcarrierSpacing                 SubcarrierSpacing,
  csi-RS-CellList                 SEQUENCE (SIZE (1..maxNrofCSI-RS)) OF CSI-RS-L1MObility,
  }
CSI-RS-L1MObility ::=             SEQUENCE {
  cellId                          PhysCellId,
  csi-rs-MeasurementBW                SEQUENCE {
    nrofPRBs                        ENUMERATED { size24, size48, size96, size192, size264},
    startPRB                        INTEGER(0..2169)
  },
  density                         ENUMERATED {d1,d3}           OPTIONAL,   --
Need R
  csi-rs-ResourceL1List               SEQUENCE (SIZE (1..maxNrofCSI-RS)) OF CSI-RS-ResourceL1
}
CSI-RS-ResourceL1 ::=             SEQUENCE {
  csi-RS-Index                    CSI-RS-Index,
  slotConfig                      CHOICE {
    ms4                             INTEGER (0..31),
    ms5                             INTEGER (0..39),
    ms10                            INTEGER (0..79),
    ms20                            INTEGER (0..159),
    ms40                            INTEGER (0..319)
  },
  associatedSSB                       SEQUENCE {
    ssb-Index                       SSB-Index,
    isQuasiColocated                BOOLEAN
  }                                                            OPTIONAL, -- Need R
  frequencyDomainAllocation           CHOICE {
    row1                            BIT STRING (SIZE (4)),
    row2                            BIT STRING (SIZE (12))
  },
  firstOFDMSymbolInTimeDomain         INTEGER (0..13),
  sequenceGenerationConfig            INTEGER (0..1023),
}
```

Example of providing an initial TCI state for PDCCH (PDCCH-Config includes the ControlResourceSet) and for PUCCH are shown in Table 17 below:

TABLE 17

ControlResourceSet and PUCCH-Config

```
ControlResourceSet ::=          SEQUENCE {
[...]
  controlResourceSetId-v1610      ControlResourceSetId-v1610   OPTIONAL -- Need
S
  ]],
[[
initialTCI-State                TCI-StateId                    OPTIONAL -- Need R
]]
}
PUCCH-Config ::=                SEQUENCE {
[...]
  schedulingRequestResourceToAddModList-v1610 SEQUENCE (SIZE (1..maxNrofSR-Resources)) OF
SchedulingRequestResourceConfig-v1610
                                                               OPTIONAL -- Need N
  ]],
[[
initial-SpatialRelation PUCCH-SpatialRelationInfoId            OPTIONAL -- Need R
]]
}
```

Operations of a RAN node 400 (implemented using the structure of FIG. 17) will now be discussed with reference to the flow charts of FIGS. 19 to 21 according to some embodiments of inventive concepts. For example, modules may be stored in memory 405 of FIG. 17, and these modules may provide instructions so that when the instructions of a module are executed by respective RAN node processing circuitry 403, processing circuitry 403 performs respective operations of the flow chart.

Figure 19:
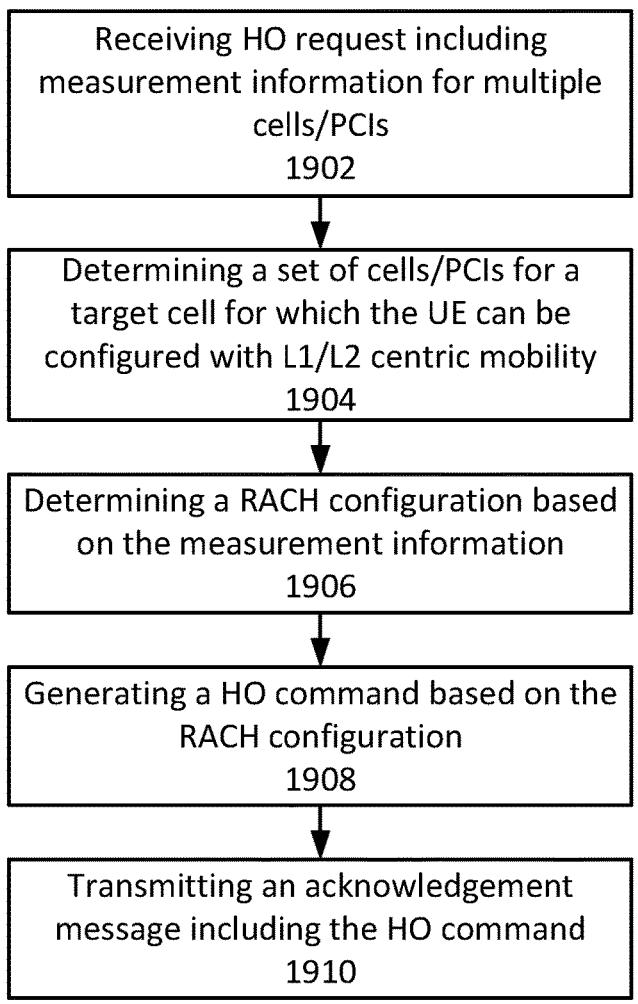
FIGS. 19 to 21 are a flow charts illustrating operations of a radio access network node according to some embodiments.

Referring to FIG. 19, a method of operating a radio access network, RAN, node (400) of a wireless communication system includes receiving (1902) a handover, HO, request from a second network node to handover a user equipment, UE, to the first network node. The HO request includes measurement information associated to multiple PCIs associated to the first network node. The method determines (1904) a set of cells and/or a set of physical cell identifiers, PCI(s), for the RAN node, for which the UE can be configured with L1/L2 centric mobility toward multiple PCIs, and determines (1906) a random access channel, RACH, configuration based on the measurement information received in the HO Request. The method generates (1908) a HO command that includes a mobility configuration for lower layer mobility associated to the multiple PCIs configured for the first network node. The lower layer mobility is used to trigger a change of cell or PCI upon reception of a lower layer signaling. The network node transmits (1910) the HO command to the second network node. The lower layer signalling may include a MAC CE.

Some embodiments provide a method at a first network node, operating as a target network node (e.g. target gNodeB) during a mobility procedure (handover) will be described. The method includes:

Receiving a HO Request from a second network node (operating as a source network node during a handover) including measurements, wherein the measurement results are associated to multiple cells and/or multiple PCIs associated to the target network node;

Determining a set of cells and/or a set of PCI(s) for the target cell, for which the UE can be configured with L1/L2 centric mobility;

Determining at least one RACH configuration based on the measurement information received in the HO Request;

Generating a HO command (e.g. an RRCReconfiguration) to be included in an RRC container;

Transmitting an Acknowledge message to the second network node operating as source network node (e.g. a source gNB), including in an RRC container the HO command e.g. the RRCReconfiguration including the reconfiguration with sync;

Receiving from the UE a random-access preamble in a random access resource (e.g. a PRACH resource in time and frequency domain);

Receiving a HO Command complete (e.g. an RRCReconfigurationComplete message) from the UE; and Starting to operate according to the L1/L2 centric mobility configuration e.g. receive L1 measurements from the UE for beams (e.g. SSBs) associated to beams of non-serving cell(s) and/or beams associated to multiple PCIs configured for that serving cell.

The HO Request can be an XnAP message Handover Request including an RRC container, wherein the RRC container includes measurement information (e.g. measurement results like RSRP, RSRQ, SINR per cell and/or per beam) associated to multiple cells/PCIs. These measurement results can be measurements per cell e.g. based on SSBs and/or CSI-RSs. These measurement results can be measurement information per beam e.g. measurement information per SSB index and/or CSI-RS index, for the cells/PCIs included in the HO Request; For example, that may be an SS-RSRP for SSB index 5 of PCI-x, and that may be an SS-RSRQ for SSB index 7 of PCI-z.

The HO Request can include a UE capability information associated to the support for L1/L2 centric mobility for that UE; That capability information may be at least one of the following:

Whether the UE supports or not L1/L2 centric mobility; and/or

If the UE supports L1/L2 centric mobility, up to how many cells the UE can be configured with for L1/L2 centric mobility (e.g. maximum number of cells); and/or If the UE supports L1/L2 centric mobility, up to how many PCIs for the target cell the UE can be configured with for L1/L2 centric mobility (e.g. maximum number of PCIs in ServingCellConfig).

Step 2004 of FIG. 19 can be performed based on at least one of the measurements associated to multiple cells and/or PCI(s) e.g. cell measurement results and/or beam measurement results, and/or the UE capability information associated to the support for L1/L2 centric mobility.

For example, the target node can determine to configure for L1/L2 centric mobility in the target node the cells for which the best quality where reported by the UE and/or the cells with higher number of beams whose measurements are above a certain threshold, etc.

In step 2006 of FIG. 19, the determined RACH configuration may be a CFRA configuration associated to a plurality of beams (e.g. SSBs, CSI-RSs, or a combination thereof), wherein each beam may be associated to a different PCI. That can be determined, for example, based on the measurements per beam for the multiple PCIs. The configuration can include preamble, RAR parameters, a list of candidate beams that include beams associated to multiple PCI(s) and/or cells (e.g. candidate SSBs for PCI-x and PCI-y, and/or candidate SSBs for cell-x and cell-y).

A RACH configuration may be a CBRA configuration associated to a plurality of beams (e.g. SSBs, CSI-RSs, or a combination thereof), wherein each beam may be associated to a different PCI. That can be determined, for example, based on the measurements per beam for the multiple PCIs. The configuration can include preamble, RAR parameters, a list of allowed candidate beams that include beams associated to multiple PCI(s) and/or cells (e.g. candidate SSBs for PCI-x and PCI-y, and/or candidate SSBs for cell-x and cell-y) and/or a list of allowed cells and/or PCI(s) the UE is allowed to select beams (e.g. SSBs) for random access resource selection.

In some embodiments, the HO command includes at least RACH configuration(s) associated to multiple PCI(s) and/or multiple cell(s) e.g. candidate list of beam(s) and/or cell(s) and/or PCI(s) for random access resource selection. The RACH configuration can be associated to multiple PCI(s) and/or multiple cells. In some embodiments, there can be multiple RACH configurations, each associated to a PCI and/or a cell, out of a set of PCI(s) and/or set of cell(s). The RACH configuration may include a L1/L2 centric mobility configuration.

Figure 20:
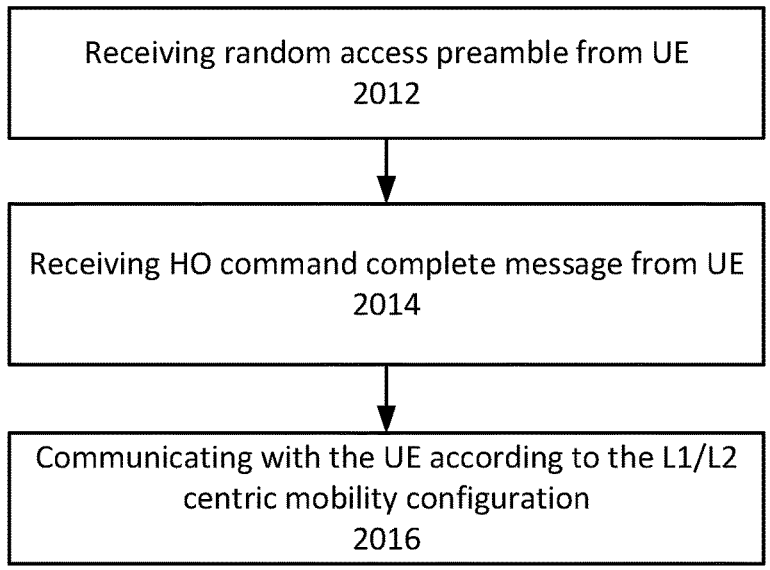
Figure 21:
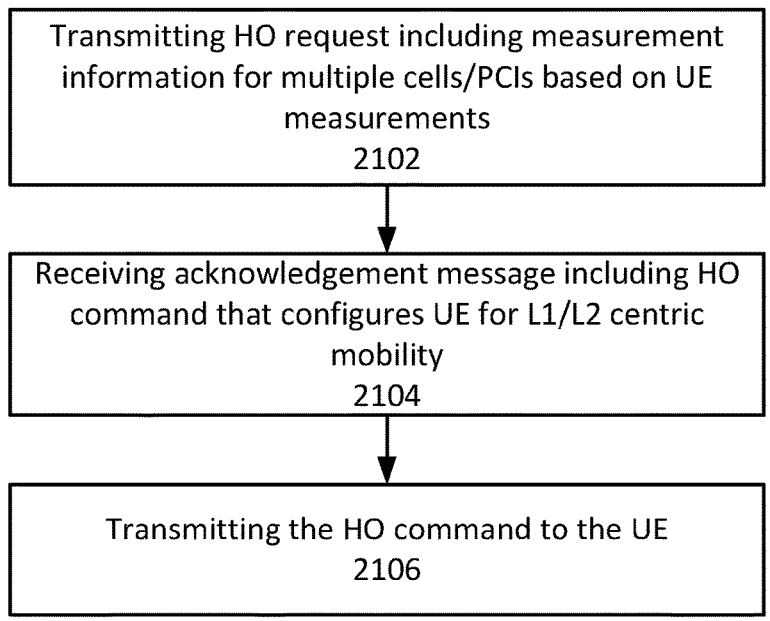

Referring to FIG. 20, the method may further include receiving (2012) from the UE a random-access preamble in a random access resource, receiving (2014) a HO command complete message from the UE, and communicating (2016) with the UE according to the L1/L2 centric mobility configuration.

When receiving from the UE a random-access preamble in a random access resource (e.g. a PRACH resource in time and frequency domain), the node may determine an associated beam (e.g. associated SSB) the UE has selected for the random access resource selection; and/or determine an associated cell and/or PCI of the selected beam (e.g. associated SSB) e.g. the PCI encoded by the PSS/SSS of the SSB the UE has selected.

Some embodiments also provide a method at a second network node, operating as a source network node (e.g. Source gNodeB) during a mobility procedure (handover). Referring to FIG. 21, a method of operating a radio access network, RAN, node (400) of a wireless communication system according to further embodiments includes transmitting (2102) a handover, HO, request, to a first network node to handover a user equipment, UE, to the first network node. The HO request includes measurement information associated to multiple cells and/or multiple physical cell identifiers, PCIs, associated to the first network node based on measurements reported by the UE. The method further includes receiving (2104) a message from the first network node, the message including a HO command that configures the UE for L1/L2 centric mobility at the first network node, and transmits (2106) the HO command to the UE. In particular, the HO command includes a mobility configuration for lower layer mobility associated to multiple physical cell identities, PCIs, configured for the first network node. The lower layer mobility is used to trigger a change of cell or PCI upon reception of a lower layer signaling. The lower layer signalling may include a MAC CE.

The HO Request can be an XnAP message Handover Request including an RRC container, wherein the RRC container includes measurement information (e.g. measurement results like RSRP, RSRQ, SINR per cell and/or per beam) associated to multiple cells/PCIs. These measurement results can be measurements per cell e.g. based on SSBs and/or CSI-RSs. The measurement results can be measurement information per beam e.g. measurement information per SSB index and/or CSI-RS index, for the cells/PCIs included in the HO Request; For example, that may be an SS-RSRP for SSB index 5 of PCI-x, and that may be an SS-RSRQ for SSB index 7 of PCI-z.

The HO Request can include a UE capability information associated to the support for L1/L2 centric mobility for that UE; That capability information may be at least one of the following:
  Whether the UE supports or not L1/L2 centric mobility; and/or
  If the UE supports L1/L2 centric mobility, up to how many cells the UE can be configured with for L1/L2 centric mobility (e.g. maximum number of cells); and/or
  If the UE supports L1/L2 centric mobility, up to how many PCIs for the target cell the UE can be configured with for L1/L2 centric mobility (e.g. maximum number of PCIs in ServingCellConfig).

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

REFERENCES

[1] 3GPP TS 38.300 v16.3.0
[2] 3GPP TS 38.331 v16.2.0
[3] 3GPP TS 38.321 v16.2.1
[4] 3GPP TS 38.211 v16.3.0
[5] 3GPP TS 38.213 v16.3.0
[6] 3GPP TS 38.133 v16.5.0

The invention claimed is:

1. A method of operating a user equipment, UE, the method comprising:
  receiving a handover, HO, command, to perform a handover to a target cell, wherein the HO command comprises a mobility configuration for lower layer mobility associated to multiple physical cell identities, PCIs, configured for the target cell, wherein the lower layer mobility is used to trigger a change of at least a cell or a PCI upon reception of a lower layer signaling; and
  applying the HO command including the mobility configuration.

2. The method of claim 1, wherein the mobility configuration for lower layer comprises a dedicated configuration, wherein the dedicated configuration is applied upon reception of the lower layer signaling indicating a change of PCI and/or a change of cell for the UE, wherein the dedicated configuration comprises TCI states associated to PCI(s) that can be different from the PCIs configured for the target cell.

3. The method of claim 1, wherein the HO command comprises an RRCReconfiguration including a Reconfiguration WithSync information element.

4. The method of claim 1, wherein the lower layer signaling comprises a medium access control, MAC, control element, CE.

5. The method of claim 1, wherein the mobility configuration for lower layer comprises a cell configuration that is different from a cell configuration for the target cell, wherein the cell configuration is applied upon reception of a lower layer signaling indicating a change of cell for the UE.

6. The method of claim 1, wherein the mobility configuration is provided using delta signaling that indicates changes from an existing mobility configuration of the UE.

7. The method of claim 1, wherein the HO command comprises a contention free random access, CFRA, configuration associated to a plurality of beams of the target cell indicated in the HO command.

8. The method of claim 7, wherein respective ones of the plurality of beams are associated to different physical cell identifiers.

9. The method of claim 7, further comprising:
  performing a random access procedure to the target cell using the CFRA configuration, wherein performing the random access procedure comprises:
  selecting a beam for transmitting a random access preamble based on the CFRA configuration;
  determining resources on the selected beam for transmitting the random access preamble;
  transmitting the preamble on the determined resources of the selected beam;
  receiving a random access response in response to the preamble; and
  transmitting a reconfiguration complete message in response to the random access response.

10. The method of claim 9, wherein selecting the beam comprises at least one of:
  prioritizing a PCI or a cell identified in the CFRA configuration;
  selecting a synchronization signal block, SSB, or channel state information reference signal, CSI-RS, associated to any PCI and/or cell configured in the CFRA configuration; and
  selecting a SSB or CSI-RS according to an order of priority provided in the CFRA configuration.

11. The method of claim 10, wherein selecting the beam comprises selecting a beam based on a power measurement associated with the beam being above a threshold.

12. The method of claim 11, wherein the power measurement comprises a reference signal received power, RSRP, measurement.

13. The method of claim 11, wherein the threshold is configured with one of: per SSB per PCI, per CSI-RS per PCI, per PCI, for both contention free random access, CFRA, and contention based random access, CBRA, and per PCI and/or cell for CFRA and per PCI and/or cell for CBRA.

14. The method of claim 1, wherein the mobility configuration comprises a set of common random access parameters for a plurality of different PCIs.

15. The method of claim 1, wherein the mobility configuration comprises a CBRA configuration associated to a plurality of beams in the target cell.

16. The method of claim 15, wherein respective ones of the plurality of beams are associated to different PCIs.

17. The method of claim 1, wherein the mobility configuration comprises a CBRA configuration and a CFRA configuration, the method further comprising:

determining whether a configured beam has a power measurement associated above a predetermined threshold and is either configured for CFRA or is associated to a high priority; and selecting the configured beam.

18. The method of claim 17, further comprising, if it is determined that no configured beam has a power measurement associated above the predetermined threshold and is either configured for CFRA or is associated to a high priority, determining whether a configured beam is either configured for CBRA or is associated to a high priority; and selecting the configured beam.

19. The method of claim 18, further comprising, if it is determined that no configured beam is either configured for CBRA or is associated to a high priority, determining whether a configured beam has a CFRA configuration; and selecting the configured beam.

20. The method of claim 17, further comprising:

selecting a random access resource associated with the selected beam.

* * * * *